(12) United States Patent
Hashima et al.

(10) Patent No.: US 7,567,249 B2
(45) Date of Patent: Jul. 28, 2009

(54) THREE-DIMENSIONAL DRAWING MODEL GENERATION METHOD, THREE-DIMENSIONAL MODEL DRAWING METHOD, AND PROGRAM THEREOF

(75) Inventors: Masayoshi Hashima, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/927,086

(22) Filed: Aug. 27, 2004

(65) Prior Publication Data

US 2005/0212811 A1 Sep. 29, 2005

(30) Foreign Application Priority Data

Mar. 24, 2004 (JP) ............................. 2004-086077

(51) Int. Cl.
*G06T 17/00* (2006.01)
(52) U.S. Cl. ..................... 345/428; 345/419; 345/581
(58) Field of Classification Search ................. 345/419, 345/420, 582, 583, 584, 585
See application file for complete search history.

(56) References Cited

U.S. PATENT DOCUMENTS

| 5,786,822 | A | | 7/1998 | Sakaibara et al. |
| 5,790,269 | A | * | 8/1998 | Masaki et al. ............... 358/447 |
| 6,356,272 | B1 | * | 3/2002 | Matsumoto et al. ......... 345/582 |
| 6,570,568 | B1 | | 5/2003 | Horn et al. |
| 2003/0063086 | A1 | * | 4/2003 | Baumberg .................. 345/420 |
| 2003/0107572 | A1 | * | 6/2003 | Smith et al. ................. 345/428 |

FOREIGN PATENT DOCUMENTS

| JP | 7-254072 | 10/1995 |
| JP | 2001-307125 | 11/2001 |
| JP | 2002-63222 | 2/2002 |
| JP | 2002-183228 | 6/2002 |

OTHER PUBLICATIONS

Watt, Alan "Advanced Animation and Rendering Techniques", Addison-Wesley, pp. 179-181.*
Mayer, Helmut. "Scale-Space Events for the Generalization of 3D-Building Data", 2000, ISPRS, vol. 33, pp. 1-7.*
Mayer, "Three Dimensional Generalization of Buildings Based on Scale Spaces", p. 1-28, 1998.*
Li, Xinyue, "Time-Critical Multiresolution Volume Rendering using 3D Texture Mapping Hardware", IEEE symposium on volume visualization and graphics, 2002, p. 29-36.*

* cited by examiner

*Primary Examiner*—Xiao M Wu
*Assistant Examiner*—David H Chu
(74) *Attorney, Agent, or Firm*—Westerman, Hattori, Daniels & Adrian, LLP.

(57) ABSTRACT

A three-dimensional drawing model generation method draw a three-dimensional model as a texture image, which decrease the number of polygons of the texture model and allows smooth drawing. By simplify appearance shape of the three-dimensional model and removing small bumps from a three-dimensional polygon model, the three-dimensional model is flattened, and the texture of the model is acquired from the three-dimensional model. Since the flattened model is created from the three-dimensional polygon model, the number of polygons can be decreased and smooth drawing can be possible.

17 Claims, 30 Drawing Sheets

FIG. 3
POLYGON MODEL 30
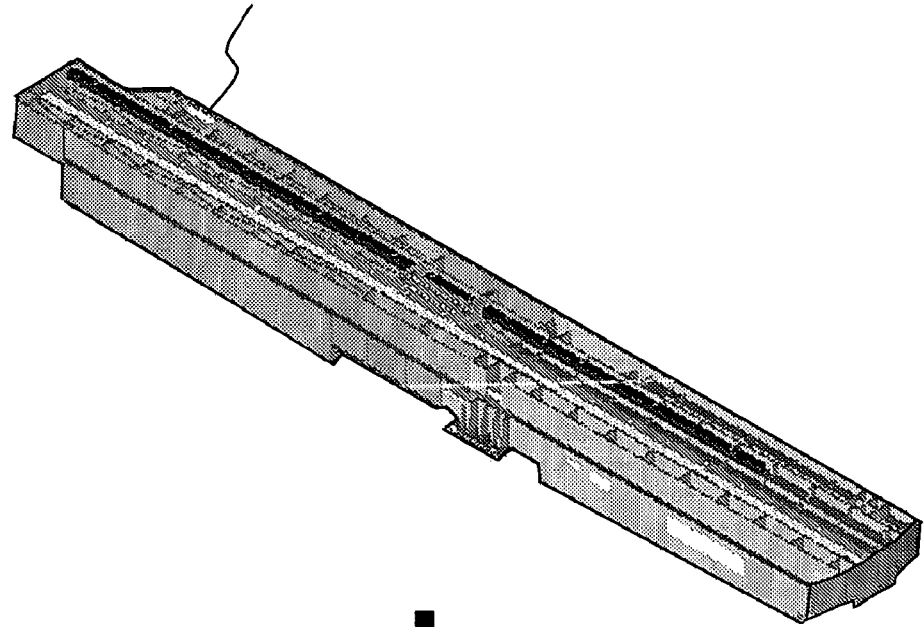
FLATTENING SURFACE
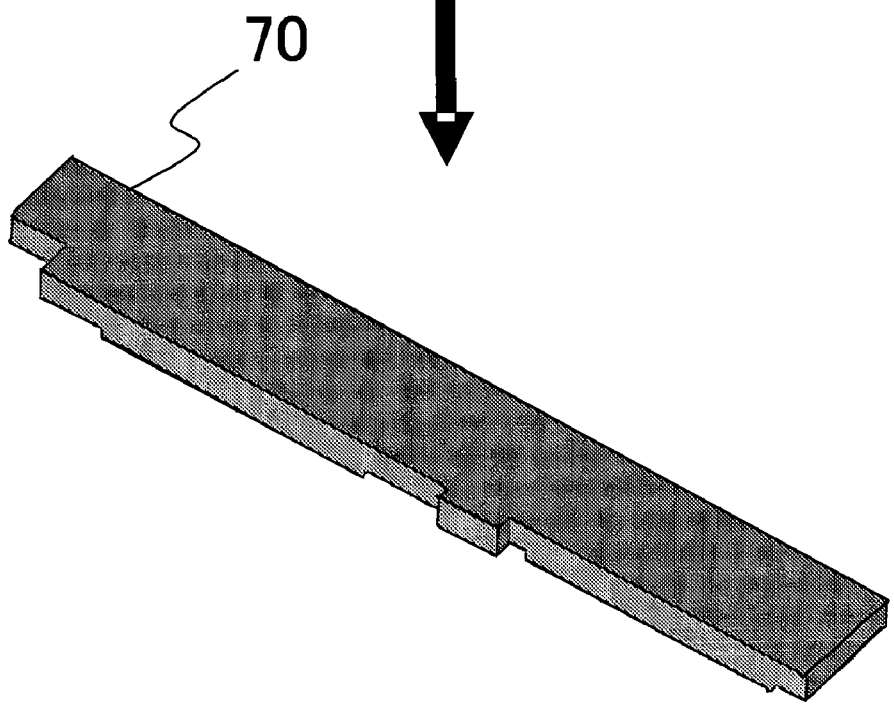
70

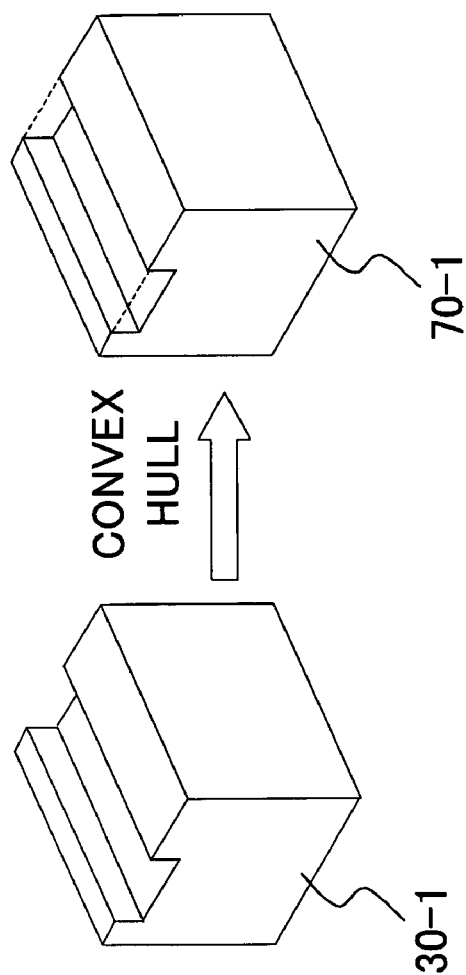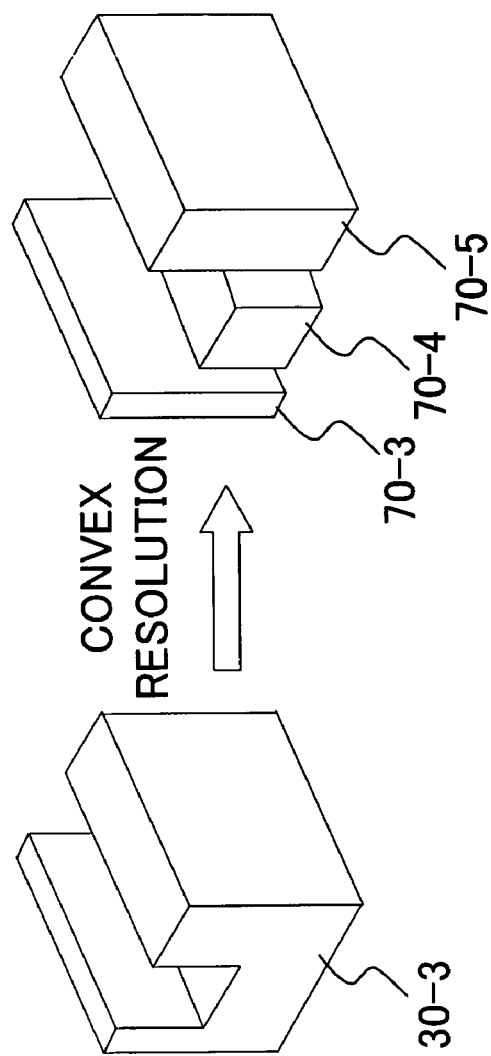

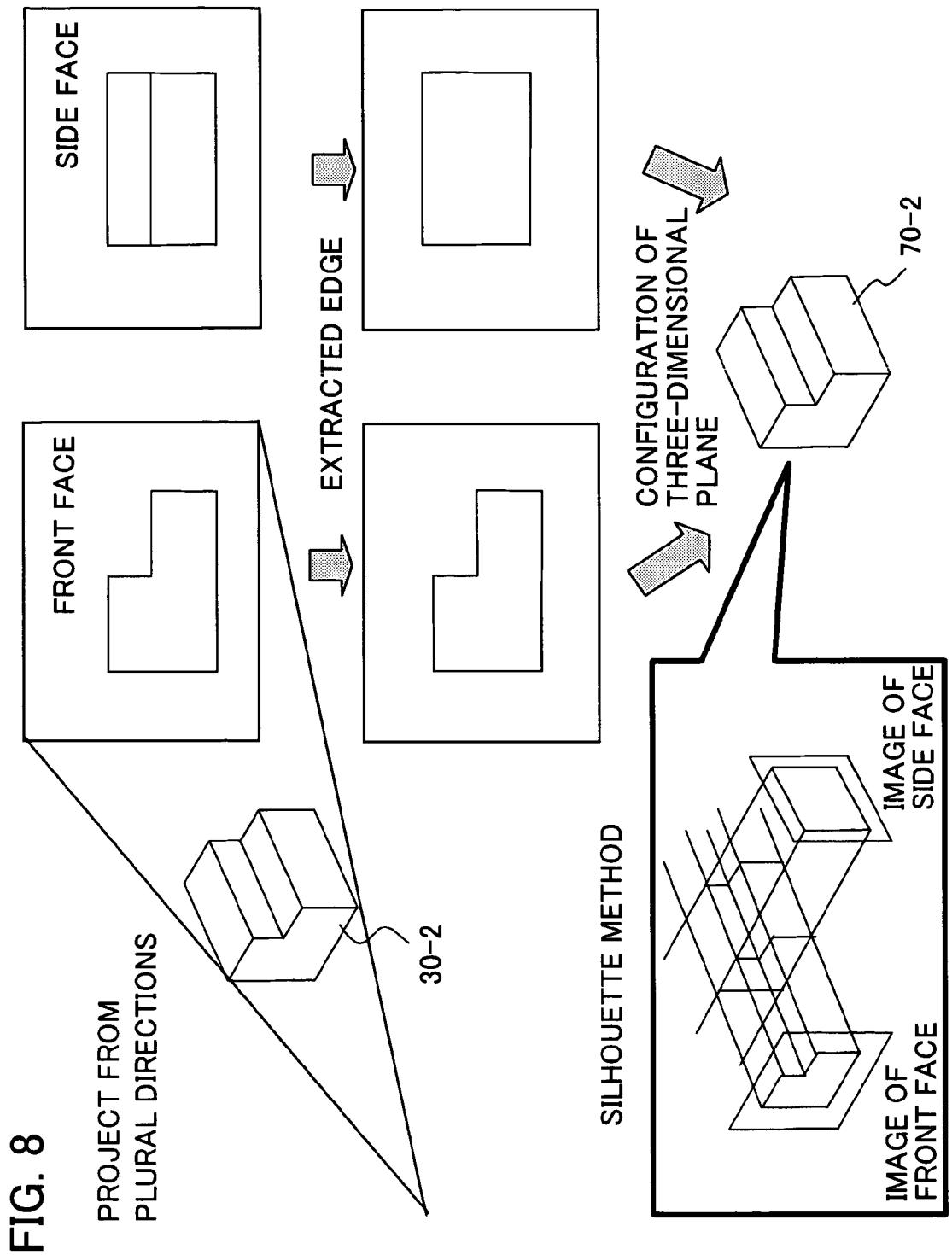

FIG. 10

| INPUT DATA: |||
|---|---|---|
| COMPONENT DATA 1 |||
| | • COMPONENT COORDINATE (POSITION AND ATTITUDE OF COMPONENT IN WORLD COORDINATE)<br>　　POSITION: double Pc[3], ATTITUDE: double Rc[3][3] ||
| | • GROUP OF POLYGON DATA ||
| | | POLYGON DATA<br>• APEX POSITION OF TRIANGLE<br>　(POSITION IN COMPONENT COORDINATE)<br>　　POSITION: double Pv0[3], Pv1[3], Pv2[3] |
| | | ⋮ |
| COMPONENT DATA 2 |||
| | ⋮ ||

FIG. 11

| OUTPUT DATA: |||
|---|---|---|
| SURFACE DATA 1 |||
| | • TEXTURE IMAGE (BIT MAP FILE) ||
| | • POLYGON DATA AND MAPPING DATA ||
| | | • APEX POSITION OF TRIANGLE<br>　　POSITION: double Pv0[3], Pv1[3], Pv2[3]<br>• APEX POSITION IN TEXTURE IMAGE<br>　　POSITION: double s, t |
| | | ⋮ |
| POLYGON DATA AND MAPPING DATA |||
| | ⋮ ||

POLYGON MODEL

CONVEX FULL MODEL

TEXTURE IMAGES FOR EACH POLYGON

THREE-DIMENSIONAL DRAWING MODEL GENERATION METHOD, THREE-DIMENSIONAL MODEL DRAWING METHOD, AND PROGRAM THEREOF

CROSS-REFERENCE TO RELATED APPLICATIONS

This application is based upon and claims the benefit of priority from the prior Japanese Patent Application No. 2004-086077, filed on Mar. 24, 2004, the entire contents of which are incorporated herein by reference.

BACKGROUND OF THE INVENTION

1. Field of the Invention

The present invention relates to a three-dimensional drawing model generation method and three-dimensional drawing method suitable for computer graphics (CG) and computer aided design (CAD), and a program thereof, and more particularly to a three-dimensional drawing model generation method and a three-dimensional model drawing method for decreasing the number of polygons using texture mapping, and a program thereof.

2. Description of the Related Art

Systems for constructing three-dimensional virtual models, such as mechanical products and electric components, on a computer are widely used in the field of computer graphics and computer aided design.

To express three-dimensional models, a model surface is defined by small polygons, by which various shapes are expressed. As FIG. 34 shows, if a three-dimensional object 1000, which has many holes 1020 on one face 1010, is modeled with polygons, the face 1010 is expressed by many triangular polygons so as to express the holes 1020. In other words, the face 1010 is defined as data using a large volume of polygon data (three-dimensional vertex coordinates).

If this three-dimensional model is large scale or complicated, the number of polygons increases, so the drawing processing amount increases, which makes it difficult to draw at high-speed. Although the drawing processing capability is improving due to advancements in hardware, three-dimensional models are also becoming more complicated and are increasing in scale, so it is difficult to draw large scale models, such as automobiles, airplanes, ships and factory lines, smoothly.

When an entire view of a large model is drawn, small convex and bump portions are drawn small, and are hardly seen. Therefore, by making the area with such small bumps to be texture, small polygons can be decreased.

As FIG. 35 shows, texture is a drawing technology for mapping the texture images 1030-1 and 1030-2 on the face 1010 comprised of several polygons 1010-1 and 1010-2, and fine patterns can be drawn at high-speed. A model to express this texture is called a texture model.

In a three-dimensional object (three-dimensional model), it has been proposed to automatically create texture on the face defined as a plane by a two-dimensional graphic function, as shown in FIG. 35 (e.g. Japanese Patent Application Laid-Open No. 2002-063222).

According to this conventional method, the number of polygons can be decreased by a texture model, but even with this, many planes exist in a three-dimensional model with complicated shapes, and the number of polygons thereof is enormous. Therefore further improvement is necessary to draw a three-dimensional model with complicated shapes smoothly.

SUMMARY OF THE INVENTION

With the foregoing in view, it is an object of the present invention to provide a three-dimensional model generation method and three-dimensional model drawing method for generating a texture model with fewer number of polygons, even if a three-dimensional model has complicated shapes, so as to draw at high-speed; and a program thereof.

It is another object of the present invention to provide a three-dimensional model generation method and a three-dimensional model drawing method for simplifying the shape of a three-dimensional model, and generating a texture model with fewer number of polygons so as to draw at high-speed; and a program thereof.

It is still another object of the present invention to provide a three-dimensional model generation method and a three-dimensional model drawing method for generating a texture model that is optimum for drawing according to an enlargement ratio of the three-dimensional model, so as to draw at high-speed; and a program thereof.

To achieve these objects, a three-dimensional drawing model generation method for generating a texture model for drawing a three-dimensional model as a texture image according to the present invention has the steps of flattening the surface of the three-dimensional model, acquiring the texture image of the flattened surface from the drawing image of the three-dimensional model, and generating the texture model by polygons of the flattened surface and the texture image.

A three-dimensional model drawing method for drawing a three-dimensional model as a texture image according to the present invention has the steps of drawing polygons of a model obtained by flattening the three-dimensional model, and mapping the texture image of the flattened model to the flattened model.

A program for generating a texture model for drawing a three-dimensional model as a texture image according to the present invention is a program for having a computer execute the steps of flattening the surface of the three-dimensional model, acquiring the texture image of the flattened surface from the drawing image of the three-dimensional model, and generating the texture model by polygons of the flattened surface and the texture image.

A three-dimensional model drawing program of the present invention is a program for drawing a three-dimensional model as a texture image and having a computer execute the steps of, drawing polygons of a model obtained by flattening the three-dimensional model, and mapping the texture image of the flattened model to the flattened model.

In the three-dimensional drawing model generation method according to the present invention, it is preferable that the step of flattening has a step of generating a model that encloses the entirety of the three-dimensional model.

In the three-dimensional drawing model generation method according to the present invention, it is preferable that the step of flattening has a step of detecting a large hollow of the three-dimensional model, and a step of separating the three-dimensional model at the large hollow.

In the three-dimensional drawing model generation method according to the present invention, the step of detecting a large hollow of the three-dimensional model has a step of generating a model that encloses the entirety of the three-dimensional model, and a step of calculating the distance from the model that encloses the entirety of the three-dimensional model to the three-dimensional model, and a step of detecting the large hollow by the distance.

In the three-dimensional drawing model generation method according to the present invention, it is preferable that the step of flattening has a step of creating a projected image of the three-dimensional model, a step of linearly approximating a contour of the projected image, and a step of reconstructing the three-dimensional model by the linearly approximated contour.

In the three-dimensional drawing model generation method according to the present invention, it is preferable that the step of flattening has a step of extracting contours of the three-dimensional model, and a step of generating a closed face by connecting the contours.

In the three-dimensional drawing model generation method according to the present invention, it is preferable that the step of flattening has a step of creating a projected image of the separated three-dimensional models respectively, a step of linearly approximating the contours of the projected image, and a step of reconstructing the separated three-dimensional model by the linearly approximated contours.

In the three-dimensional drawing model generation method according to the present invention, it is preferable that the step of detecting a large hollow includes a step of detecting the large concave void by comparing the distance being set to the calculated distance.

It is also preferable that the three-dimensional drawing model generation method according to the present invention has a step of generating texture models with different precision, by changing the distance being set.

It is also preferable that the three-dimensional drawing model generation method according to the present invention has a step of generating texture models with different precision, by changing the linear approximation precision of the contours of the projected image.

It is also preferable that the three-dimensional drawing model generation method according to the present invention has a step of calculating the difference between the drawing image of the texture model and the drawing image of the three-dimensional model, and a step of changing generation parameters of the texture model.

It is also preferable that the three-dimensional model drawing method according to the present invention has a step of selecting the flattened model and the texture image with different precision according to the distance between a view point and the three-dimensional model.

It is also preferable that the three-dimensional model drawing method according to the present invention, includes a step of detecting when the distance between the view point and the three-dimensional model becomes smaller than a predetermined value, thereby including the drawing of a texture image from the three-dimensional model.

In the three-dimensional model drawing method according to the present invention, it is preferable that the selection step has a step of switching a plurality of flattened models and texture images, with different precision, that were obtained by calculating the difference between the texture drawing image and the three-dimensional drawing image, according to the distance between the view point and the three-dimensional model.

It is also preferable that the three-dimensional model drawing method according to the present invention further has a step of switching the texture images according to the direction of the line of sight.

It is also preferable that the three-dimensional model drawing method according to the present invention further has a step of flattening the surface of the three-dimensional model, a step of acquiring the texture image of the flattened surface from the drawing image of the three-dimensional model, and generating the texture model by the polygons of the flattened surface and the texture image.

In the present invention, the appearance shape of the three-dimensional model is simplified, and small convex and bumps are deleted from the three-dimensional polygon model so as to create a model of which surface is flattened, so the number of polygons can be decreased and smooth drawing can be possible. Therefore a complicated model can be drawn smoothly and in real-time.

BRIEF DESCRIPTION OF THE DRAWINGS

FIG. 3 is a view depicting the shape simplification processing in FIG. 2;

FIG. 6 is a diagram depicting the convex separation processing for the shape simplification in FIG. 2;

FIG. 7 is a diagram depicting the silhouette method for the shape simplification in FIG. 2;

FIG. 8 is a diagram depicting the texture mapping processing in FIG. 2;

FIG. 10 is a figure for describing the input data in FIG. 9;

FIG. 11 is a figure for describing the output data in FIG. 9;

DESCRIPTION OF THE PREFERRED EMBODIMENTS

Embodiments of the present invention will now be described in the sequence of the three-dimensional model drawing system, texture model creation processing, texture model drawing processing and other embodiments, however the present invention is not limited to these embodiments.

[Three-Dimensional Model Drawing System]

Figure 1:
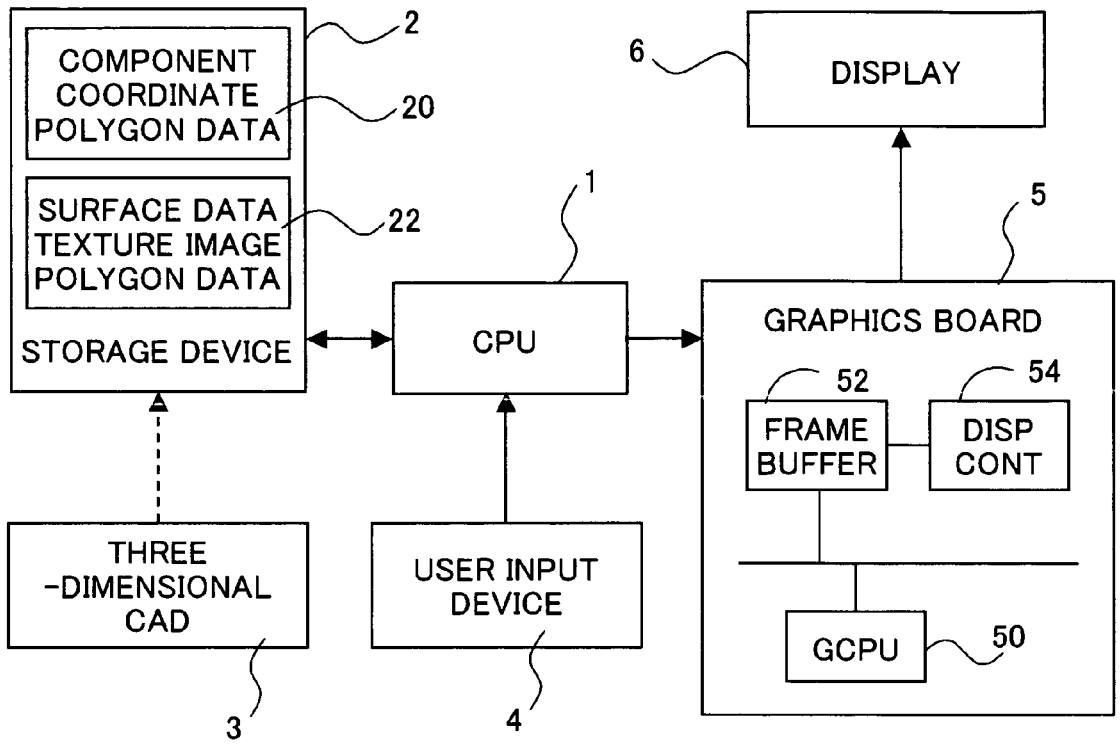
FIG. 1 is a block diagram depicting an embodiment of the three-dimensional model drawing system of the present invention.
Figure 2:
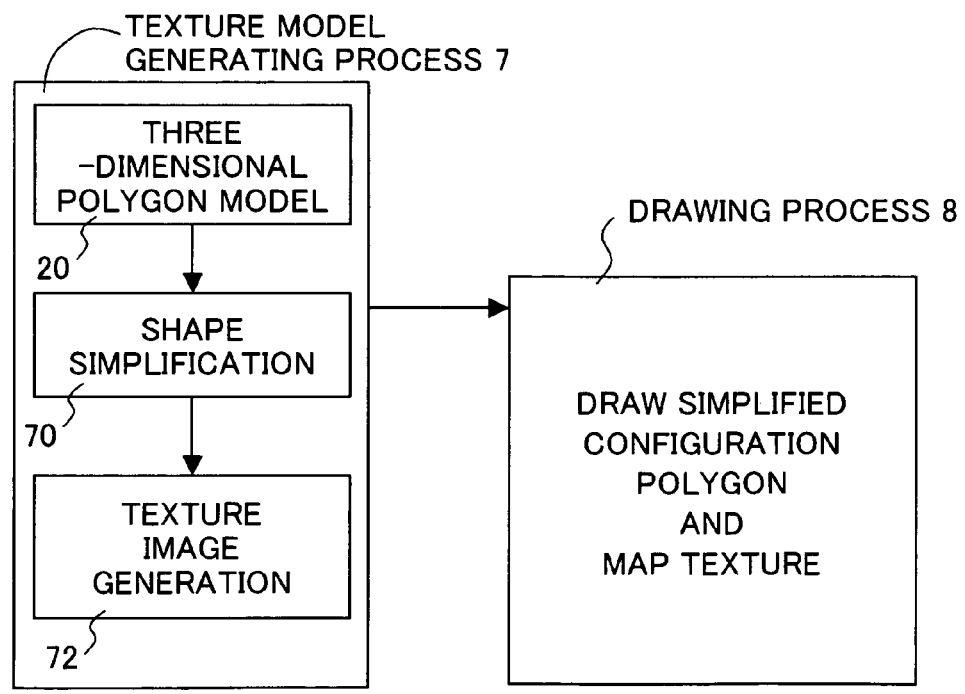
FIG. 2 is a drawing depicting the texture model creation and drawing processing of the present invention.
Figure 4:
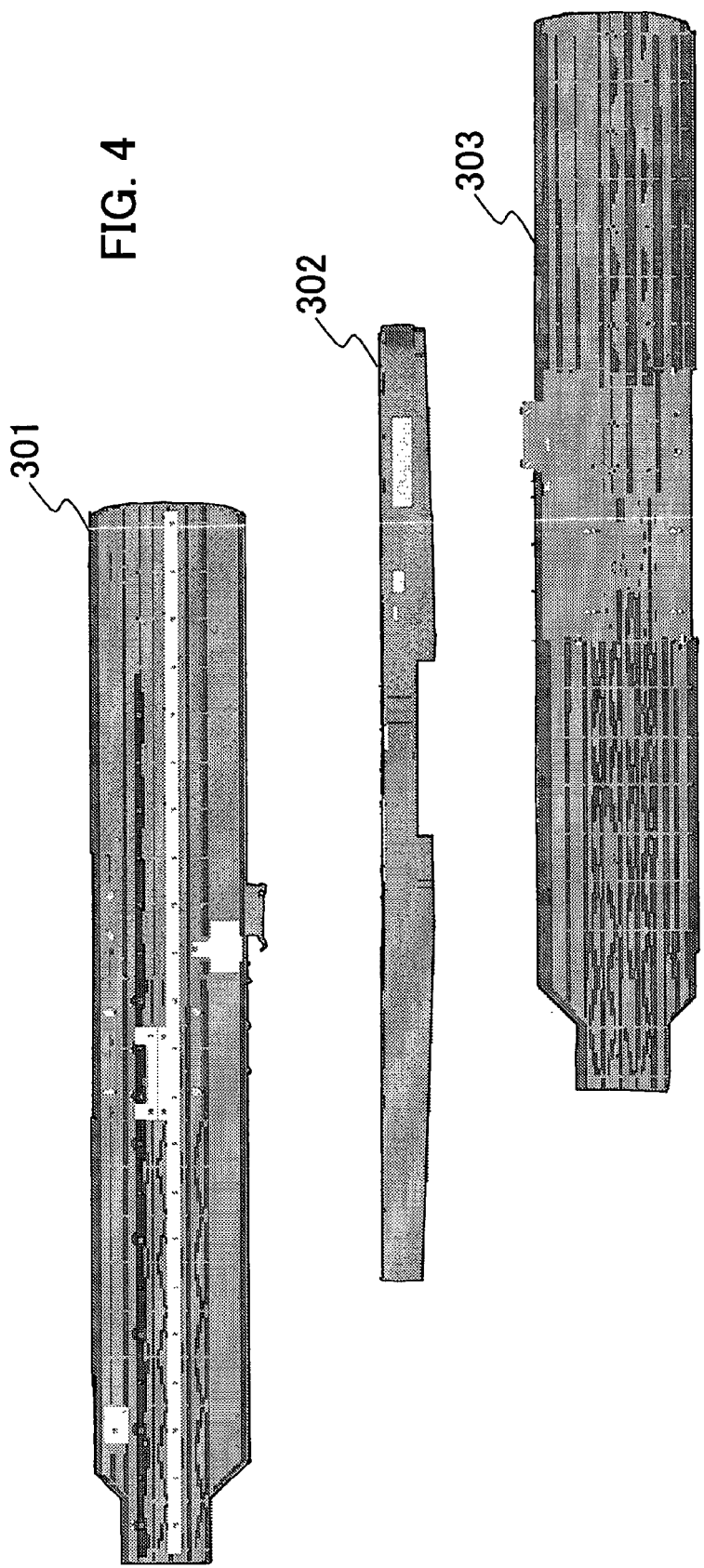
FIG. 4 is a view depicting the texture image acquisition processing in FIG. 2.
Figure 5:
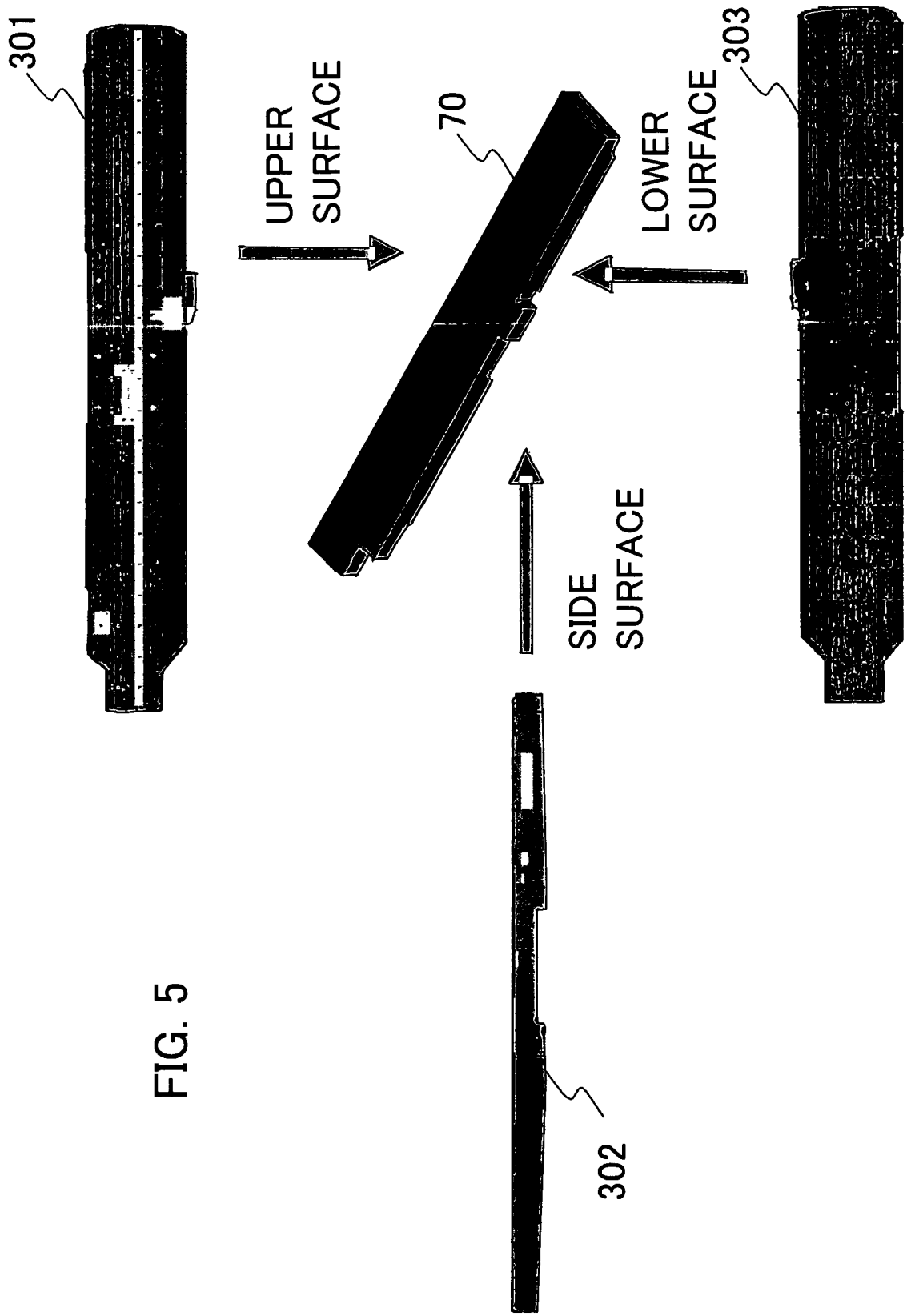
FIG. 5 is a view depicting the convex closure processing for the shape simplification in FIG. 2.

FIG. 1 is a block diagram depicting an embodiment of the three-dimensional drawing system of the present invention; FIG. 2 is a diagram depicting the texture model creation and drawing processing of the present invention; FIG. 3 is a view depicting the shape simplification processing in FIG. 2; FIG. 4 is a view depicting the texture image acquisition processing in FIG. 2; FIG. 5 is a view depicting the convex closure processing for the shape simplification in FIG. 2; FIG. 6 is a diagram depicting the convex separation processing for the shape simplification in FIG. 2; FIG. 7 is a diagram depicting the silhouette method for the shape simplification in FIG. 2; and FIG. 8 is a diagram depicting the texture mapping processing in FIG. 2.

As FIG. 1 shows, a model of the product or device designed by the three-dimensional CAD (Computer Aided Design) system 3 is converted into polygon data, and is stored in the storage device 2.

In other words, in the three-dimensional CAD system 3, normally software for converting the CAD data into polygon data for drawing has been installed, and using this, the CAD data is converted into polygon data and is stored in the input data storage area 20 of the storage device 2. Here, as described later with reference to FIG. 10, the input data is comprised of the component coordinates of each component constituting the model, and the polygon data of the component.

The CPU (Central Processing Unit) 1 executes the texture model generation processing 7 to be described in FIG. 2 by an instruction of the user input device 4, such as a mouse or keyboard, and stores the created data of the model for texture drawing in the output data area 22 of the storage device 2.

The CPU 1 transfers the polygon data and texture data in the output data area 22 of the storage device 2 to the graphics board 5 by a drawing instruction, and the graphics board 5 converts it into a two-dimensional image for drawing, and displays it on the display 5.

The graphics board 5 is comprised of the CPU for graphics 50, frame buffer 52 and display controller 54. The user input device 4 also inputs such instructions as enlargement, reduction, rotation and shifting of the model.

FIG. 2 shows the configuration of the processing module (program) to be executed by the CPU 1. The processing is generally divided into the texture model generation processing 7 and drawing processing 8.

In the texture model generation process 7, which is pre-processing, the appearance shape of the three-dimensional model is simplified. The three-dimensional polygon model 30, is simplified as shown in model 70; the small convex features and bumps are deleted, as shown in FIG. 3. In other words, small convex features, and bumps, are deleted from the appearance shape of the three-dimensional polygon model 30, and a model 70, of which surface is flattened, is created.

Then in the texture image generation processing 72, data, for mapping the appearance of the polygon model 20 on the plane of the model 70 as a texture image, is generated. For example, as FIG. 4 shows, the appearance of the polygon model in FIG. 3 is generated as texture images 301, 302 and 303 respectively for the top face, side face and bottom face of the model 70 in FIG. 3.

In the drawing processing 8, simplified shaped polygons are drawn, on which texture is mapped. As FIG. 5 shows, the texture image 301 of the top face is pasted onto the top face of the appearance model 70, the texture image 302 of the side face is pasted onto the side face, and the texture image 303 of the bottom face is pasted onto the bottom face. In other words, texture mapping is executed. By this, the original three-dimensional polygon model 30 in FIG. 3 is displayed.

A method for creating the above mentioned model 70, of which shape is simplified, will be described. As FIG. 6 shows, a convex closure configuration is used as a method of acquiring the appearance shape of the model 30-1 for the model which has only small convex features and bumps.

For the convex closure configuration, the shape 70-1, which is made of only convex parts, is calculated by determining the shape enclosing the dotted area, as if enclosing it with a balloon. As the dotted line in FIG. 6 shows, the convex closure shape is determined from all the vertexes of the polygon model 30-1, so as to acquire the appearance shape 70-1, where small convex features or bumps and inner polygons are deleted.

As FIG. 4 and FIG. 5 show, a model, exactly the same as the original model, is displayed by mapping the deleted image (texture image) of the polygons on the appearance shape. For each polygon 70-1 of the appearance shape, the image of the original polygon model included in the polygon is acquired as the texture image. For the texture image, a polygon model is drawn in a direction perpendicular to the polygon plane, and the image is acquired from the frame buffer 52.

In FIG. 6, when convex features or bumps exist on the top face of the polygon model 30-1, a convex-enclosure (or convex-hull) is executed for this face. Then this face becomes a plane, which can be created by two polygons, so that the number of polygons can be decreased. By mapping the image of the original polygon model (with convex features or bumps), onto the polygon 70-1 after inserting the convex-enclosure, a model exactly like the original polygon model can be displayed.

If a large concave (non-convex section), as shown in the model 30-3 in FIG. 7, exists, drawing becomes unnatural using the above mentioned method. So, the model is separated into sections 70-3, 70-4 and 70-5, so as to delete the non-convex sections (called convex separation or resolution). In convex separation, a non-convex section is detected from the difference between the original polygon model 30-2, and the convex enclosure shaped polygon model described in FIG. 6, and the depth thereof is calculated.

If the depth exceeds a predetermined value, that area is regarded as the separation target, and the cutting plane that includes the deepest position (vertex) is considered, and this area is separated into three models, 70-3, 70-4 and 70-5. For each separated model, the convex separation is repeated until large non-convex sections no longer exist. By this, models with only convex features can be created.

To detect a non-convex section, a method of calculating the geometric difference between the original polygon model and the convex enclosure shaped polygon model can be used. In this method, the amount of calculation becomes enormous if the model is complicated. To decrease the amount of calculation, the depth of the non-convex section is calculated at high-speed using the depth calculation function for the hidden-surface processing of the graphics board 5.

Figure 14:
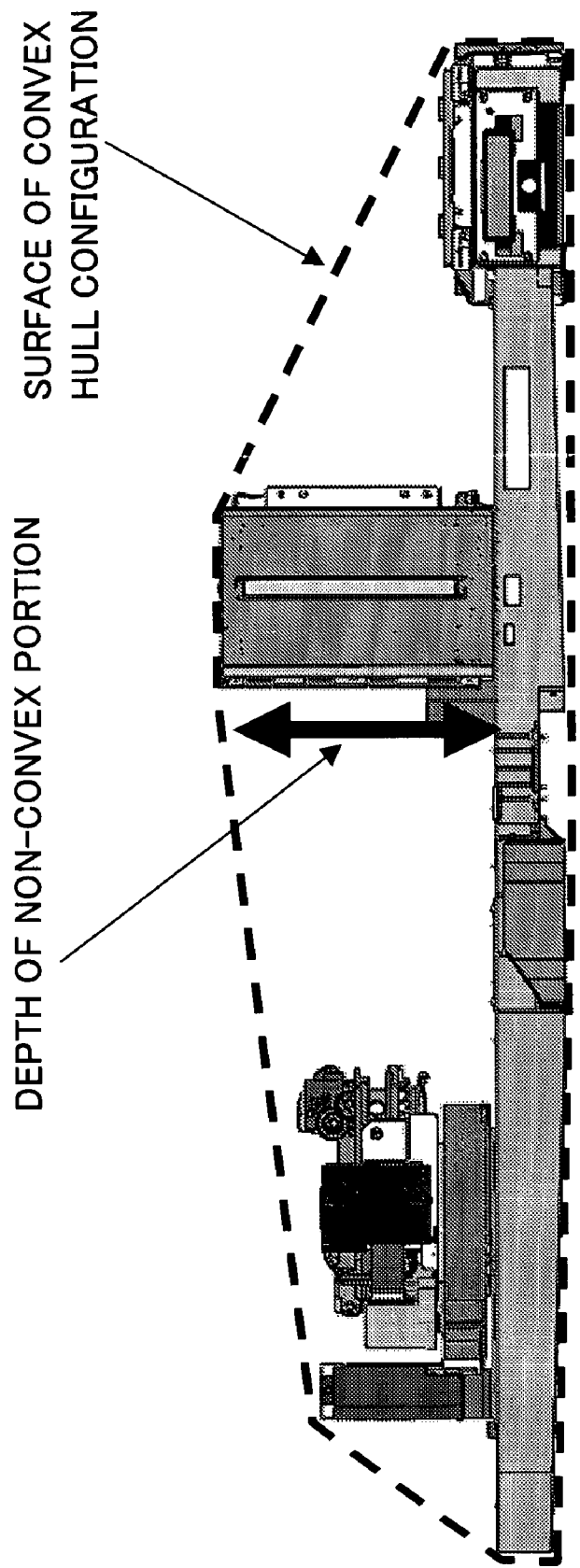
FIG. 14 is a view depicting the non-convex section detection processing in FIG. 9.

As described later in FIG. 14, viewing the original polygon model from each polygon with the convex enclosure shape in the inner direction, the surface portion of the original polygon model is drawn, and the distance (depth) thereof is calculated by the graphics board 5. By this, the depth of the non-convex section of each polygon can be acquired, so polygons having a depth of more than a predetermined value are extracted.

As a method of determining a simplified shape of the appearance, the convex enclosure configuration cannot make the surface flat if small convex sections exist. So, in order to further decrease the number of polygons, these small convex sections are flattened. In other words, a surface with convex features or bumps is flattened, and an appearance shape comprised of large surfaces is determined.

For flattening the surface, the silhouette method is used. As FIG. 8 shows, the three-dimensional model 30-2 is drawn from the front face, side face and top face. The projected images (front face, side face) thereof are acquired from the frame buffer 52, the images are binarized and the contours are extracted (edges), and are linearly approximated. Then the planes in the three-dimensional space are generated by the extracted edges, and the three-dimensional object enclosed by the planes is calculated, and as a result, the appearance shape 70-2 can be determined.

The convex features or bumps on the surface can be linearly approximated by the projection drawing processing and edge extraction processing, and the degree of flatness can be adjusted by the reduction ratio of the projection drawing and precision of the edge extraction. With this method as well, a rough model can be created to decrease the number of polygons.

In the silhouette method in FIG. 8, a non-convex shape cannot be constructed, so depending on the model, the entire model is roughly separated into convex sections. In the case of the model 30-3 having the polygon shapes shown in FIG. 7, the silhouette method in FIG. 8 cannot construct a non-convex section between a convex section and another convex section.

Therefore, as described above in FIG. 7, the large non-convex section 70-4 is detected by the convex separation (or resolution), then the model is cut there and separated into three sections, 70-3, 70-4 and 70-5. Particularly, in order to detect a non-convex section in an assembly model comprising a plurality of components, the model 30-3 is first enclosed by the convex enclosure, as shown in FIG. 6, and the distance from the surface of the convex closure to the component surface is measured. To measure this distance at high-speed, the depth buffer (distance data) of the graphics board 5 is used.

If a model has faces in various directions, such as the case of a dodecahedron, the projection directions must be increased. For this, a method of simplifying the appearance of each single component is used. As described later in FIG. 33, this method extracts the contour of the component, and creates a closed face by connecting the contours.

[Texture Model Generation Processing]

Figure 9:
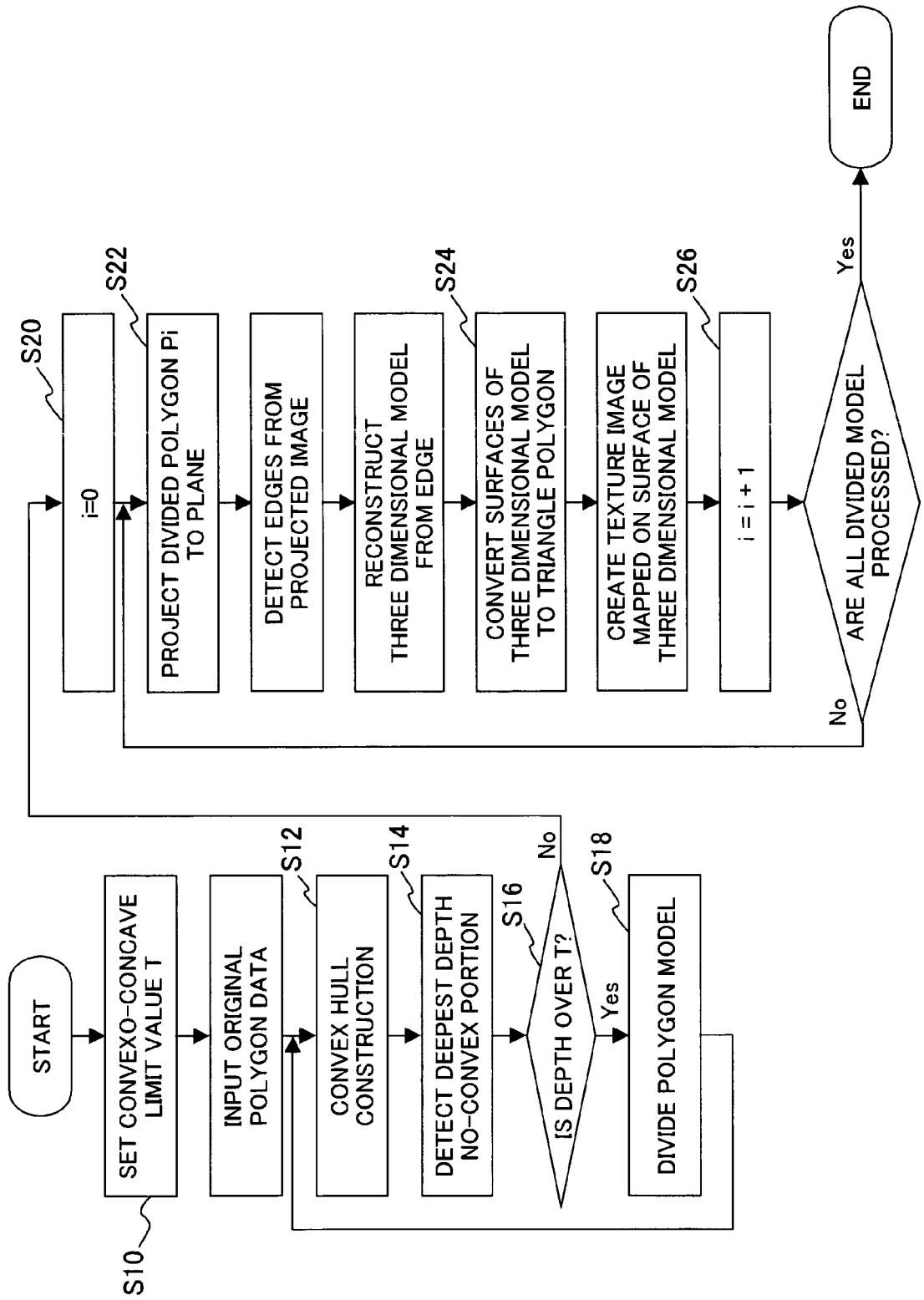
FIG. 9 is a flow chart depicting the texture model generation processing according to an embodiment of the present invention.
Figure 12:
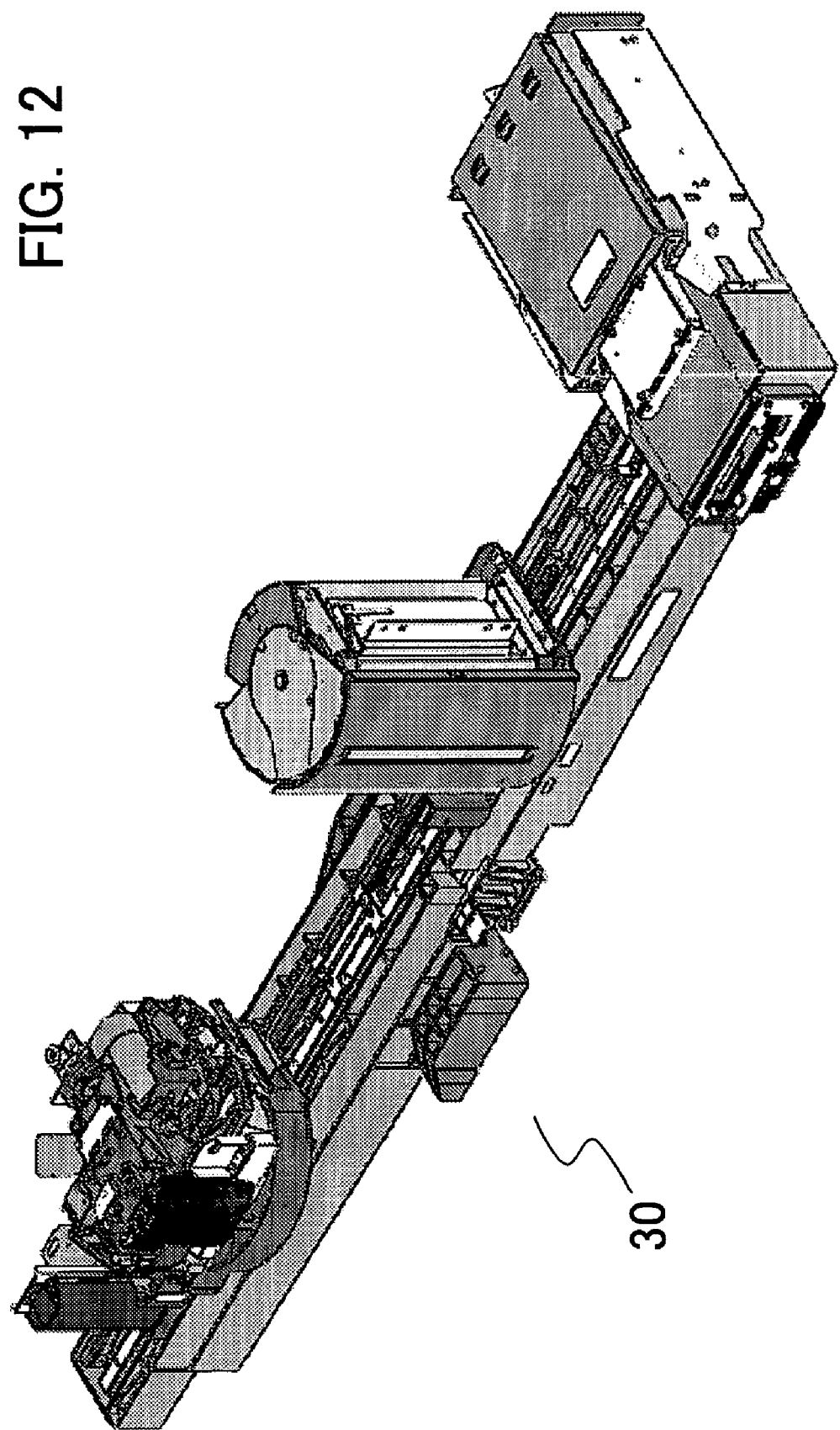
FIG. 12 is a view depicting an example of the polygon model in FIG. 9.
Figure 13:
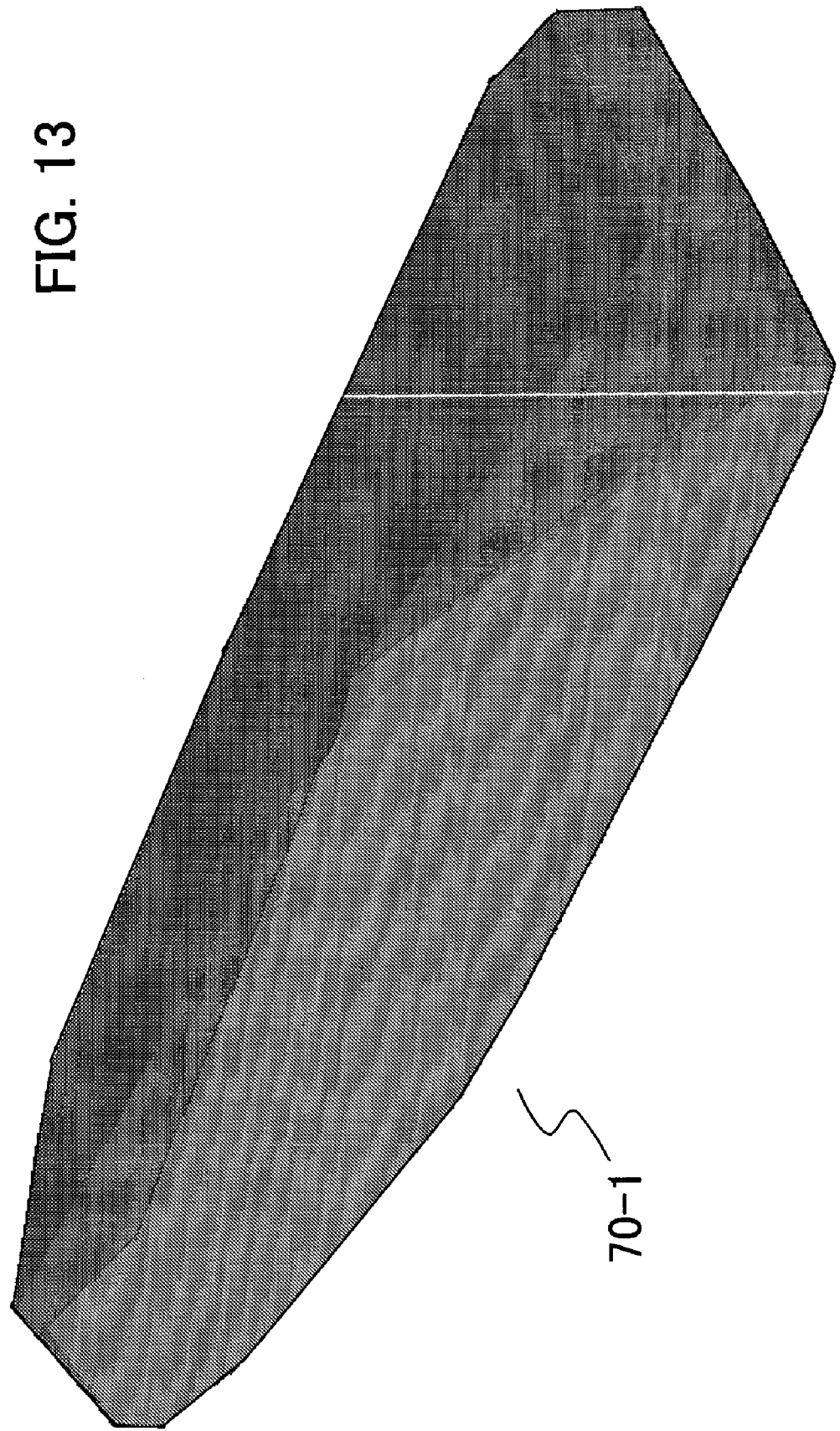
FIG. 13 is a view depicting the model when convex closure configuration is used in FIG. 9.
Figure 15:
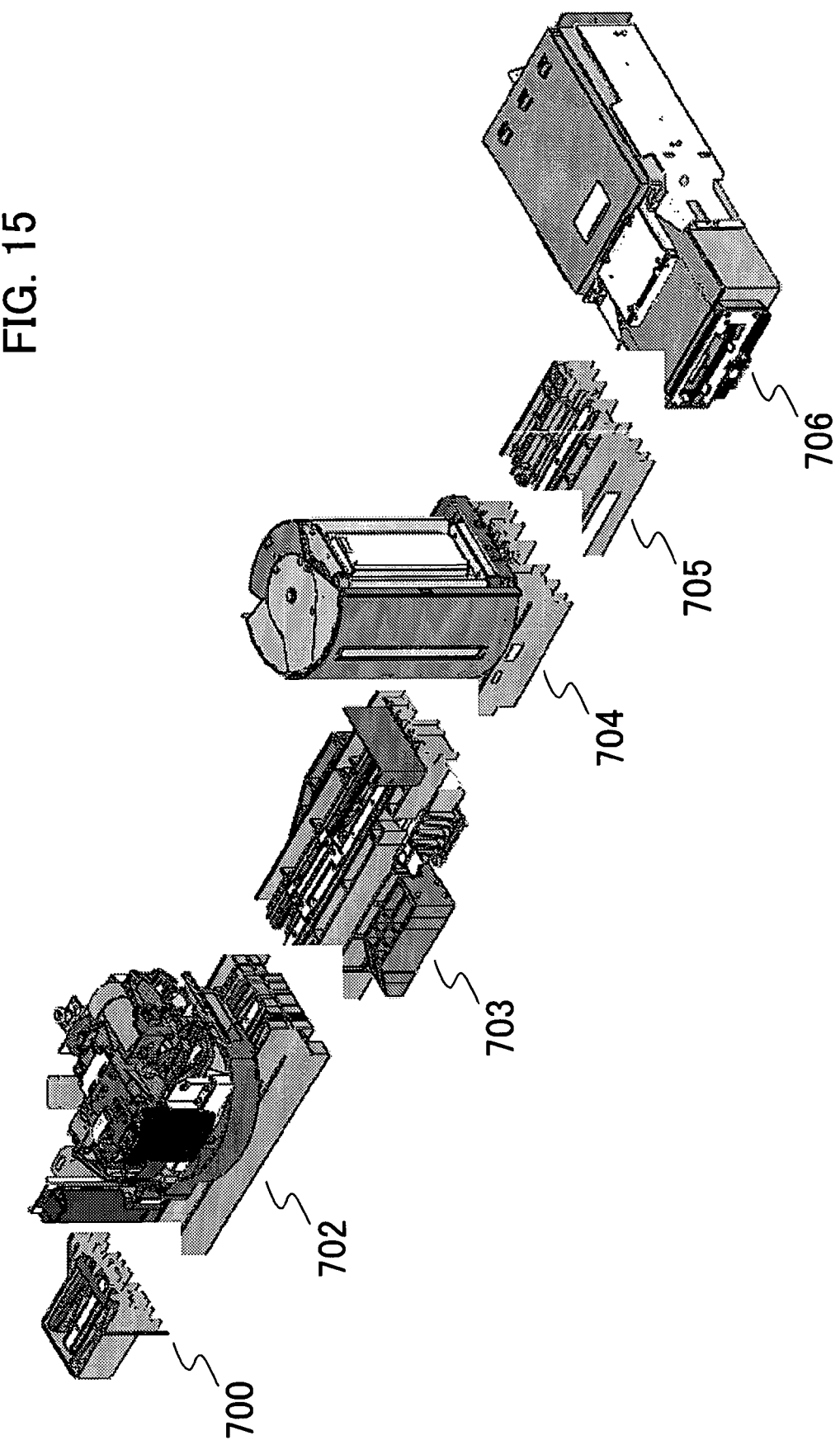
FIG. 15 is a view depicting the polygon model separation processing in FIG. 9.
Figure 16:
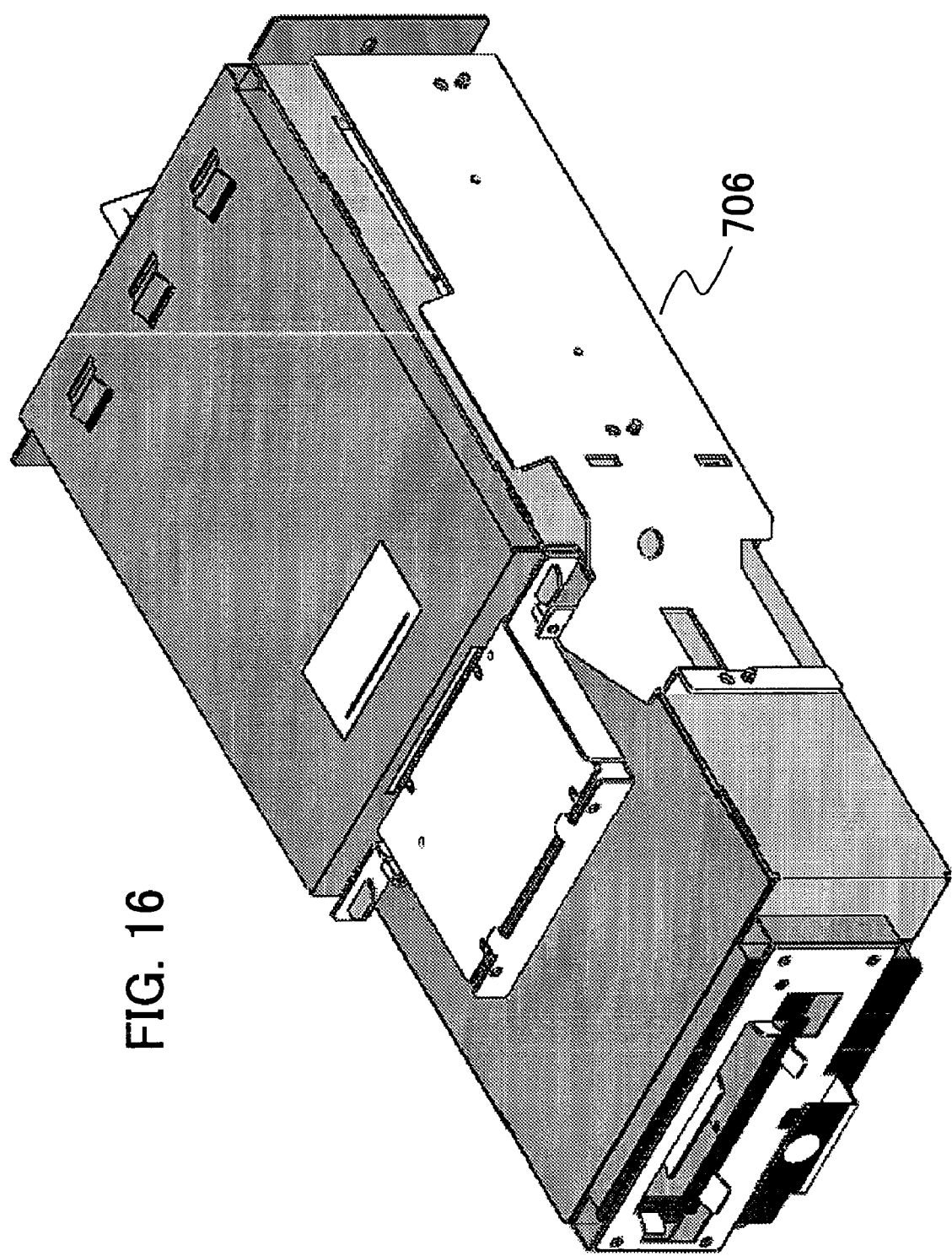
FIG. 16 is a view depicting one model separated in FIG. 15.
Figure 17A:
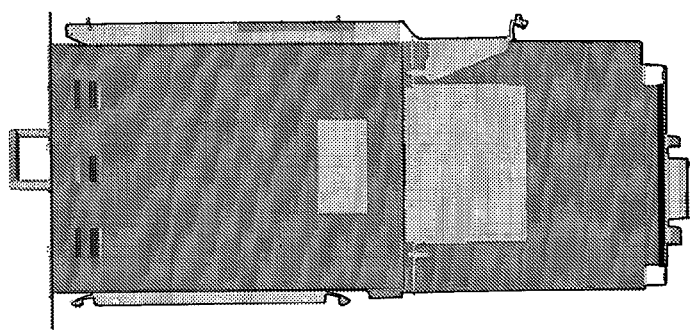
FIGS. 17 (A), 17 (B) and (C) are views depicting the projected images in FIG. 9.
Figure 17B:
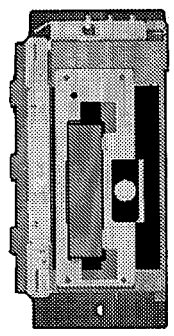
Figure 17C:
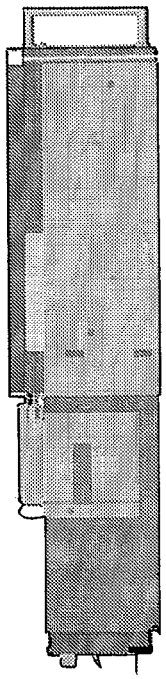
Figure 18:
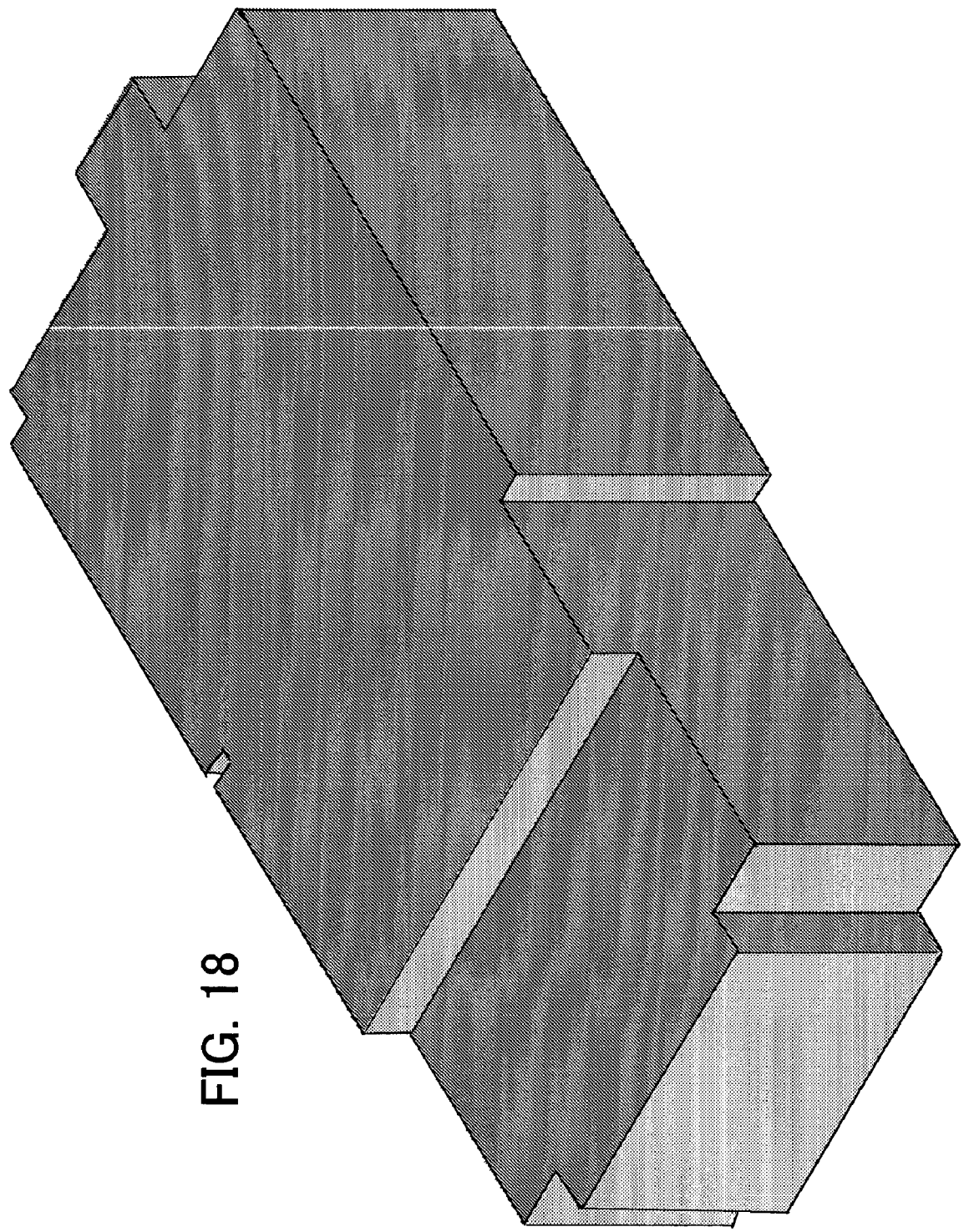
FIG. 18 is a view depicting the reconstruction of the three-dimensional model in FIG. 9.
Figure 19:
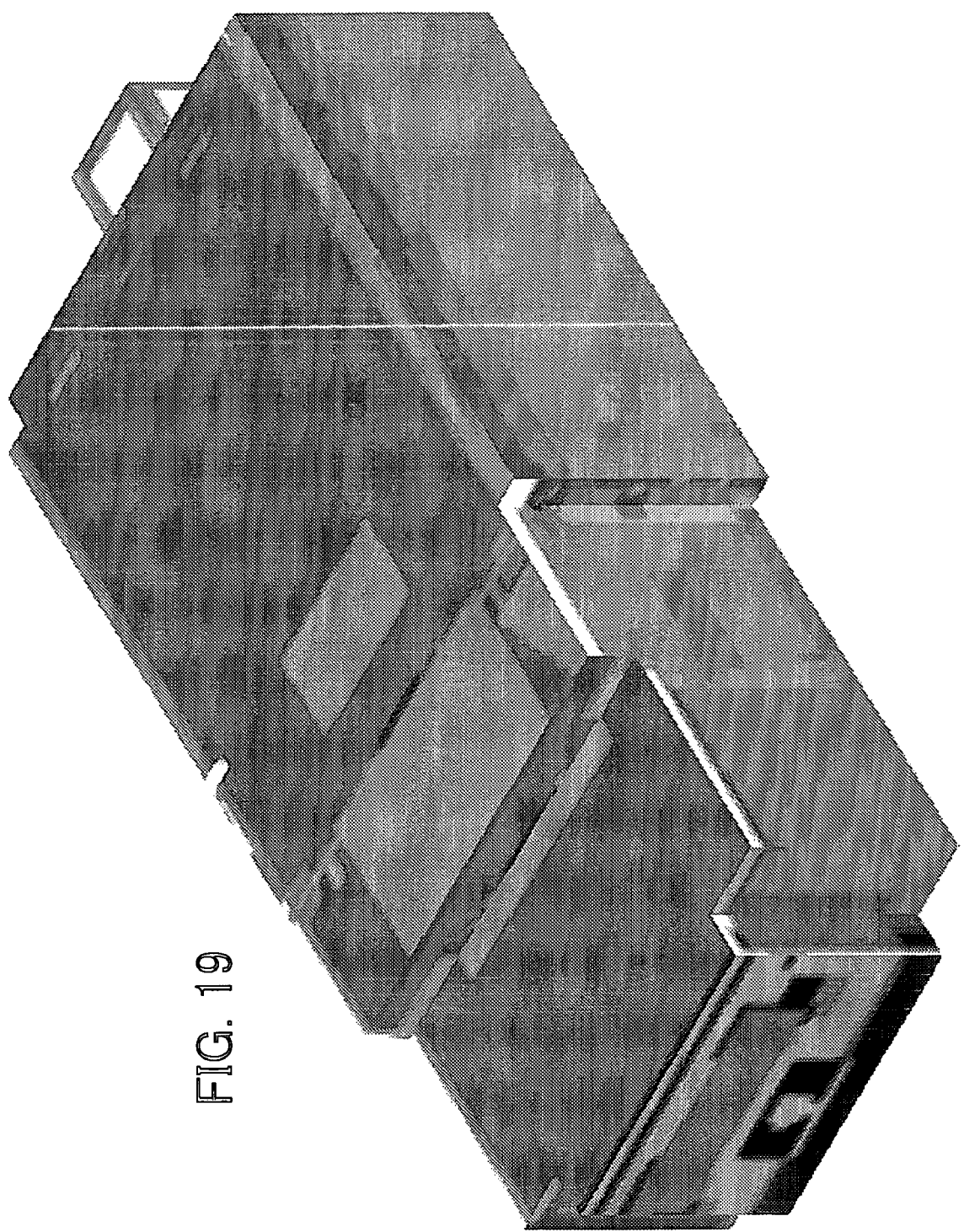
FIG. 19 is a view depicting the texture mapping in FIG. 9.
Figure 20:
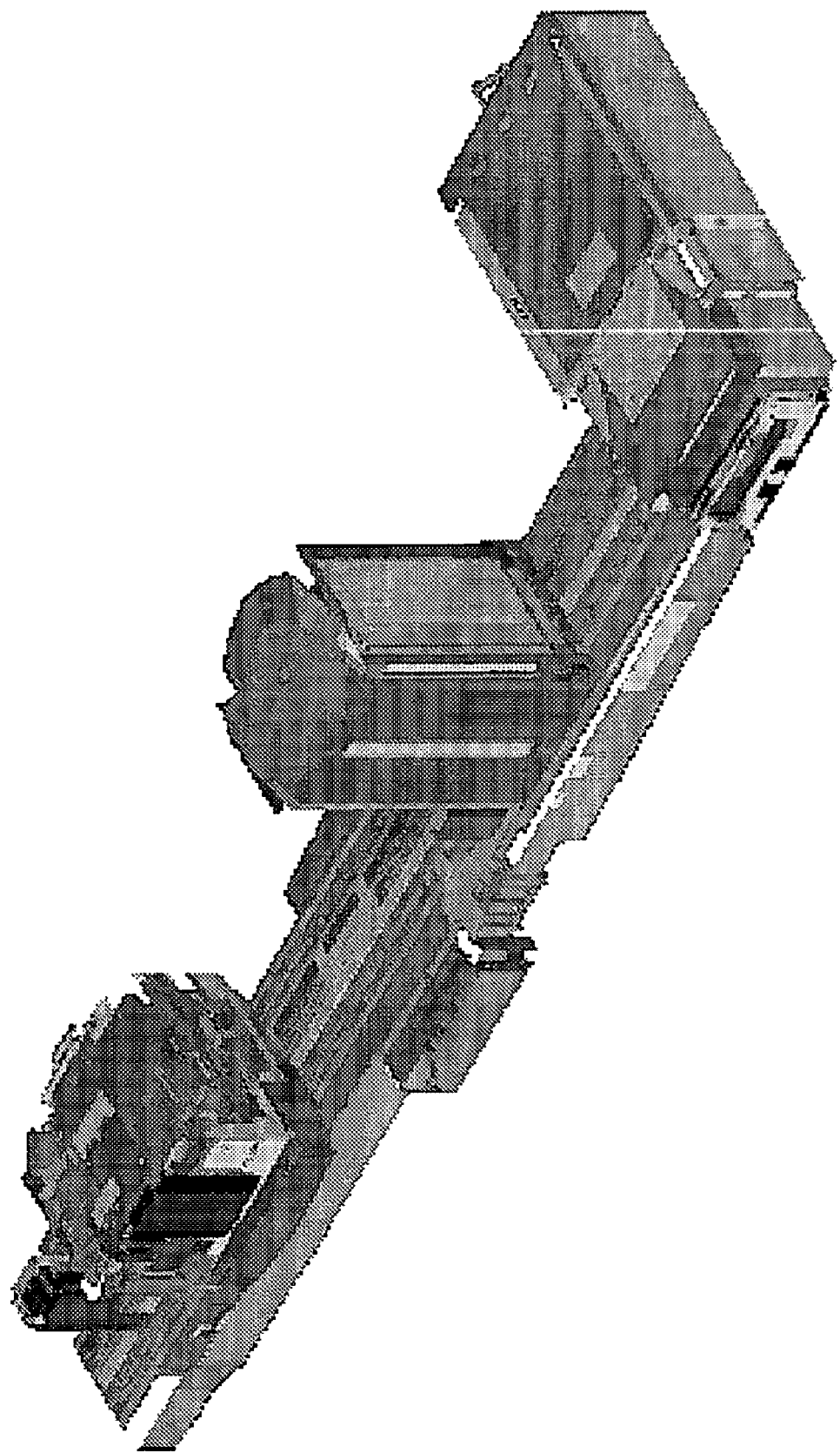
FIG. 20 is a view depicting the texture model of the polygon model in FIG. 12 according to the processing in FIG. 9.

Now the texture model generation processing for drawing a three-dimensional model will be described in concrete terms. FIG. 9 is a flow chart depicting the texture model generation processing according to an embodiment of the present invention; FIG. 10 is a figure for describing the input data in FIG. 9; FIG. 11 is a figure for describing the output data in FIG. 9; FIG. 12 is a view depicting an example of the polygon model; FIG. 13 is a view depicting the model when convex closure configuration is used in FIG. 9; FIG. 14 is a view depicting the non-convex section detection processing in FIG. 9; FIG. 15 is a view depicting the polygon model separation processing in FIG. 9; FIG. 16 is a view depicting one model separated in FIG. 15; FIGS. 17 (A), 17 (B) and 17 (C) are views depicting the projected images in FIG. 9; FIG. 18 is a view depicting the reconstruction of the three-dimensional model in FIG. 9; FIG. 19 is a view depicting the texture mapping in FIG. 9; and FIG. 20 is a view depicting the texture model of the polygon model in FIG. 12 according to the processing in FIG. 9.

The processing flow in FIG. 9 will be described with reference to FIGS. 10 through 20.

(S10) At first, the convex features or bump tolerance T, which is a non-convex section detection parameter, is set. By this convex features or bump tolerance, the precision of the model is determined. Then the original polygon data is input. The original polygon data, which is input data, is a set of parts constituting the model shown in FIG. 10. For example, in the case of the model where the plurality of components are connected, as shown in FIG. 12, the original polygon data is the data on each component. The component data is component coordinates and a set of polygon data creating the components. The component coordinates are comprised of the position (three-dimensional) of the component in world coordinates and the orientation (rotation angle with respect to each axis). Polygon data are vertex coordinates (three-dimensional) of the triangle of the component coordinates.

(S12) For this polygon model, convex enclosure configuration processing is performed. In the convex enclosure configuration process, the shape is calculated by shapes comprised of only convex sections. In other words, from all the vertexes of the polygon model, the convex enclosure shape shown in FIG. 13 is determined. The appearance shape can be acquired, when small convex features, bumps, and polygons inside the shape are deleted. For example, if convex enclosure configuration processing is performed for the polygon model in FIG. 12, the appearance shape 70-1 shown in FIG. 13 is acquired.

(S14) Then to execute convex separation, the deepest non-convex section is detected. As FIG. 14 shows, when the original polygon model is viewed from each polygon of the convex closure shape (configuration) to the inner direction, the surface portion of the original polygon model is drawn, and the distance (depth) thereof is calculated by the graphic board 5. By this, the depth of the non-convex section for each polygon can be acquired.

(S16) The depth of the non-convex section for each polygon is judged where the deepest depth of the non-convex section is more than the convex features or bump tolerance T, which was set in step S10. When the detected depth is not more than the convex features or bump tolerance T, the convex separation is ended, and processing advances to S20.

(S18) When the detected depth is more than the convex features or bump tolerance T, on the other hand, the polygon model 30 is separated. In other words, the cutting plane that includes the deepest position (vertex) in the separation target is considered, and the model is separated, as shown in FIG. 7. Then processing returns to step S12, convex enclosure configuration processing is executed for each separated model, and the convex separation is repeated until large non-convex sections no longer exist. By this, models with only small convex features or bumps can be created. FIG. 15 is an example when the polygon model 30 in FIG. 12 is separated by the convex separation, and the polygon model is separated into six models, 700, 702, 703, 704, 705 and 706.

(S20) The number pointer i of the separated polygon model is initialized to "0", and processing for each separated model is executed.

(S22) Processing by the silhouette method is executed for the separated polygon model Pi. In other words, as FIG. 8 shows, the three-dimensional model is drawn from the front face, side face, and top face, and the projected images (front face, side face) thereof are acquired from the frame buffer. And the projected images are binarized and then extracted the contours (edges), and are linearly approximated. Then the planes in the three-dimensional space are generated from the extracted edges, and the three-dimensional object enclosed by the planes is calculated, and the three-dimensional model is reconstructed. The convex features or bumps on the surface can be linearly approximated by the drawing processing and edge extraction processing, and the degree of flatness can be adjusted by the reduction ratio and precision of edge extraction.

For example, as FIG. 16 shows, the projected images of the top face, front face and side face of the separated model (disk drive) 706 shown in FIG. 15, become FIGS. 17 (A), (B) and (C) respectively. From these projected images, edges are detected and separated models are reconstructed, then the flattened appearance shape in FIG. 18 is acquired.

(S24) Then the faces of the reconstructed model are converted into triangular polygons. For each triangular polygon, a texture image to be mapped, is acquired from the projected images in FIGS. 17 (A), (B) and (C).

(S26) The number pointer i of the above mentioned separated model is incremented "1", and it is judged whether processing of all the separated models has completed by the incremented value of the pointer i. If not completed, processing returns to step S22, and decreasing the polygons by flattening using the silhouette method and acquisition of texture are repeated. If the processing of all the separated models have been completed, the texture model generation processing ends.

FIG. 11 shows the structure of the output data (texture model) acquired in this way, where the output data is a set of the surface data, and the surface data 1 is comprised of the texture image (bit map file) of the surface, polygon data and mapping data. The polygon data are the vertex coordinates (three-dimensional) of the triangle, and the mapping data are the vertex positions (bottom face coordinate s, height t) of the texture image.

Texture mapping is performed using the output data in FIG. 11 and component coordinates in FIG. 10. When the separated models of FIG. 16 are drawn, the appearance shape is displayed as FIG. 19.

When the texture mapping and drawing are performed for the entire polygon model in FIG. 12 using the output data in FIG. 11 and component coordinates in FIG. 10, the overall appearance shape shown in FIG. 20 is displayed.

In this way, by simplifying a three-dimensional model with a complicated shape and decreasing the number of polygons, the appearance shape of the three-dimensional model with a complicated shape can be drawn smoothly.

Particularly, when it is necessary to change the view point position or to enlarge or reduce the image, the enlarged or reduced image can be displayed smoothly at high-speed.

[Texture Model Drawing Processing]

When the drawn model is enlarged and displayed, drawing speed and drawing quality can be maintained at a constant level by using an optimum texture model according to the enlargement ratio of the model at drawing.

In other words, for a scene viewed from a distance, a rough model is used, and the number of polygons are decreased considerably. For a model viewed closely, a detailed model is used to maintain the drawing quality. When a detailed model is used, the number of polygons increases, but in the drawing processing, a function for automatically deleting the models outside the visual field (called Frustum-Culling) is used, so the number of polygons in total can be decreased.

For this, texture models with different approximate precisions must be provided, so texture models with different approximate precisions are created in the above mentioned texture model generation.

Specifically, in the above mentioned convex separation, the precision of separation can be changed by the depth of the non-convex section (tolerance). For flattening the surface, the depth of the bumps to be deleted can be changed by the resolution of the projected images. In other words, the rough model or detailed model are adjusted in pre-processing using the depth of the non-convex section in the convex separation, the scale and edge detection precision of the projected images in the silhouette method, and the drawing size when the texture image is acquired.

Figure 21:
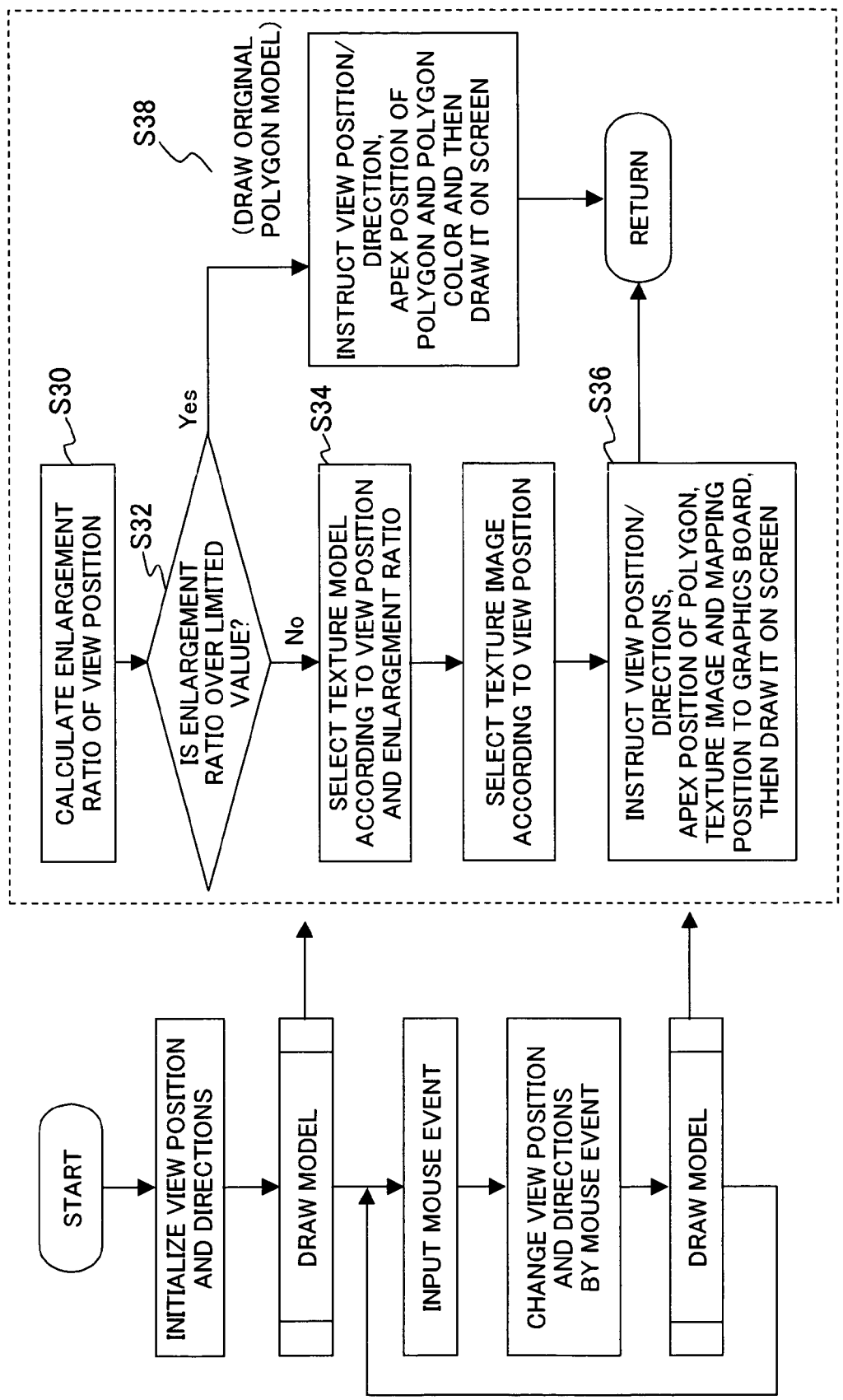
FIG. 21 is a flow chart depicting the texture model drawing processing according to an embodiment of the present invention.
Figure 22A:
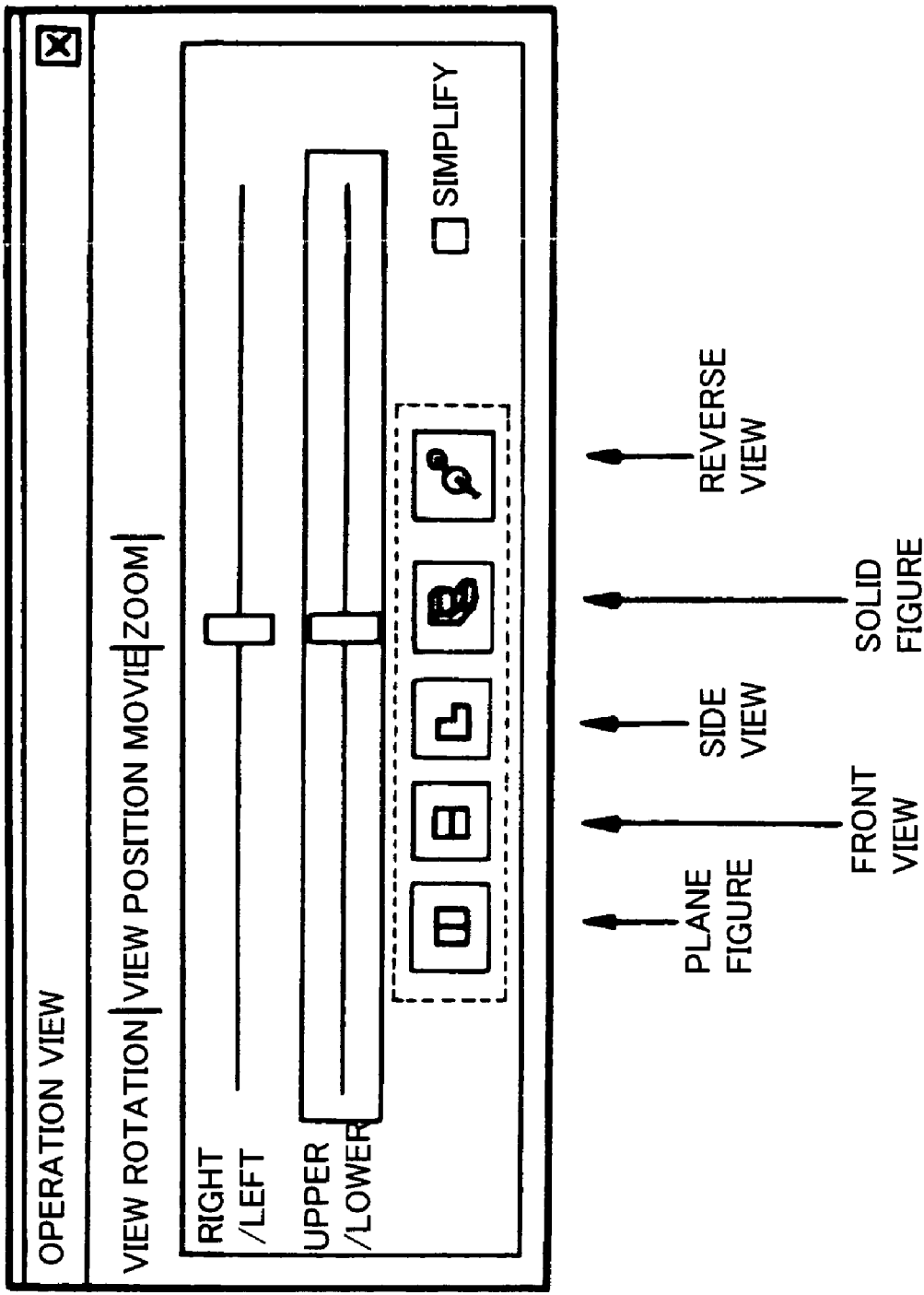
FIGS. 22 (A), (B) and (C) are diagrams depicting the view operation tool screen for FIG. 21.
Figure 22B:
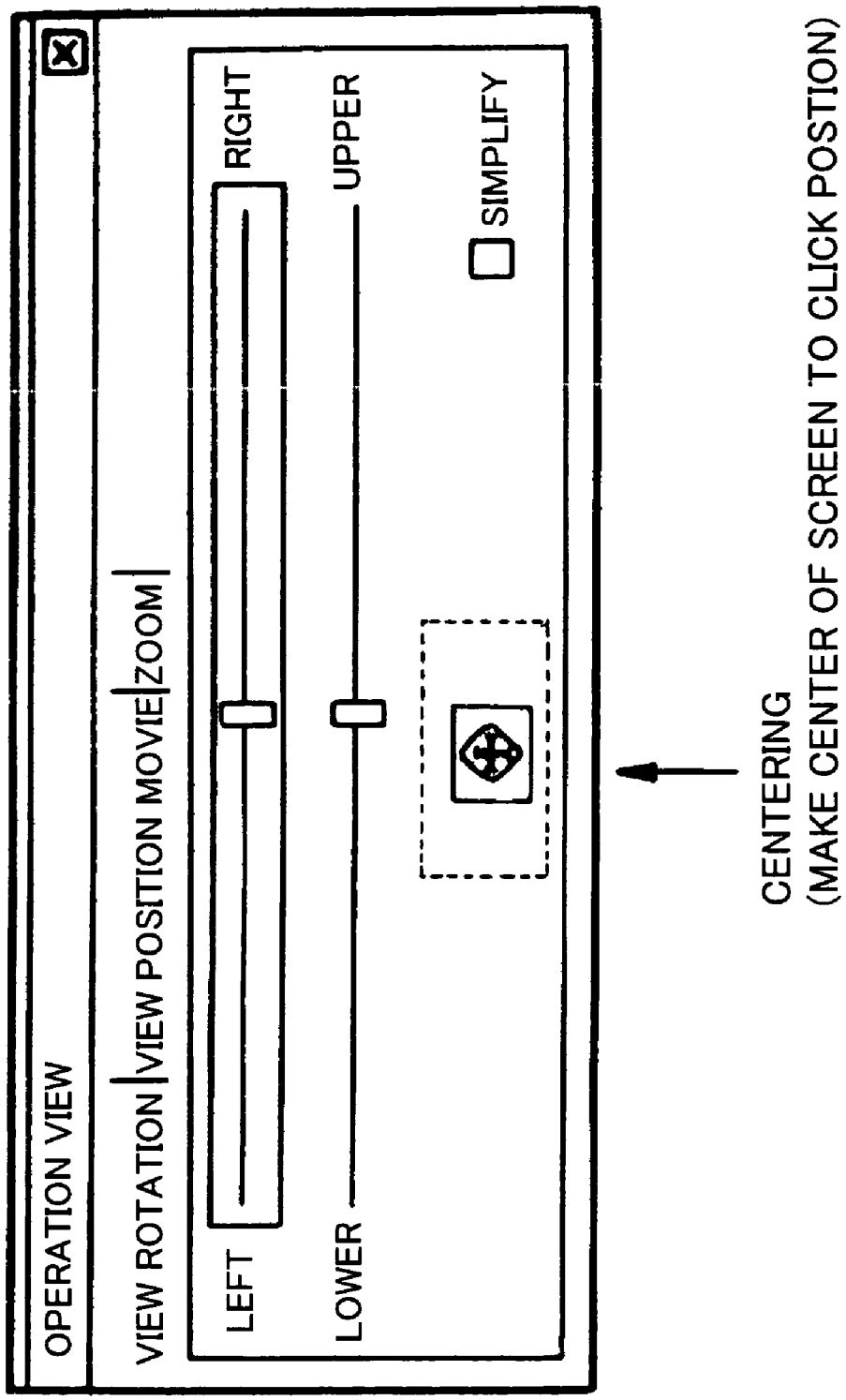
Figure 22C:
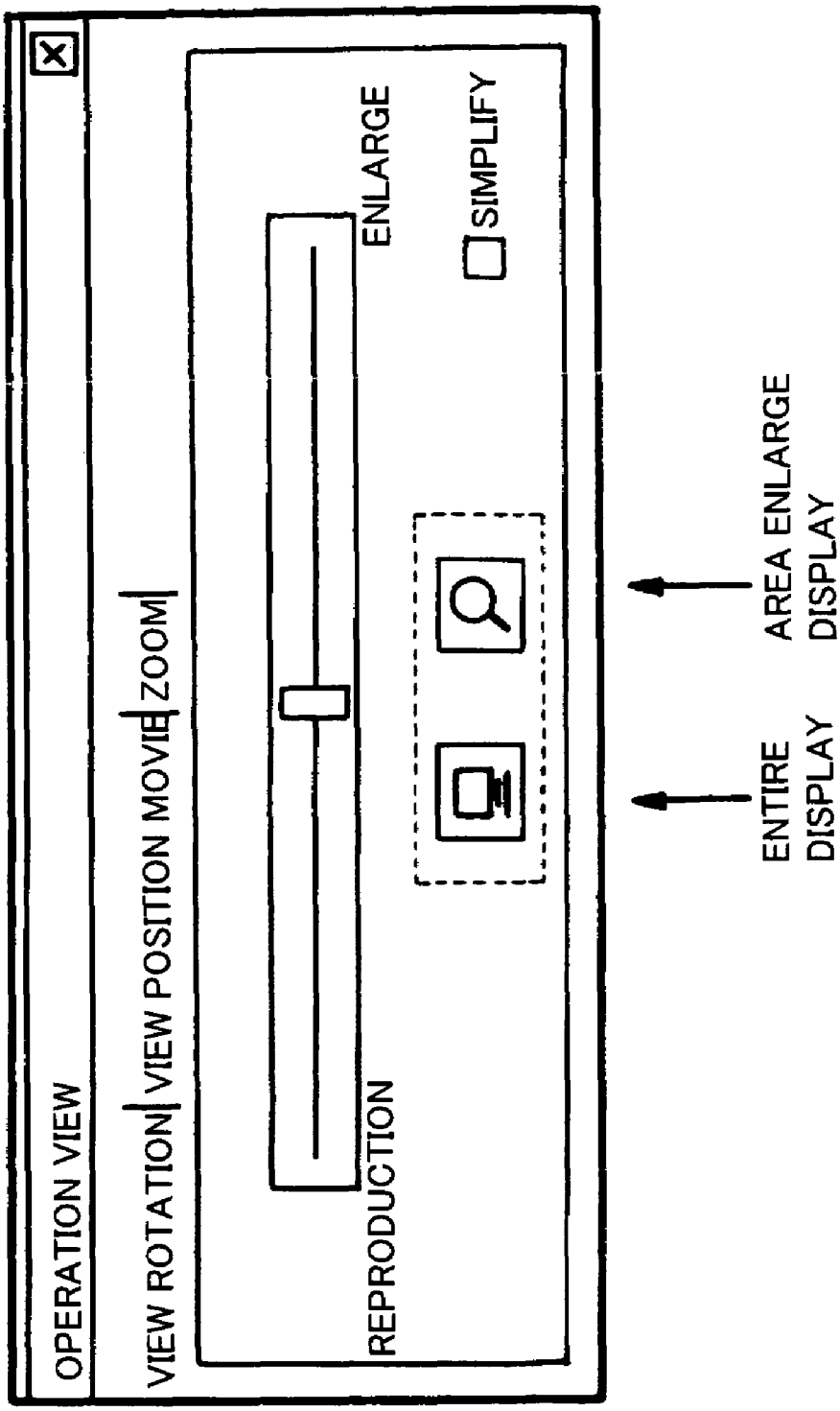
Figure 23:
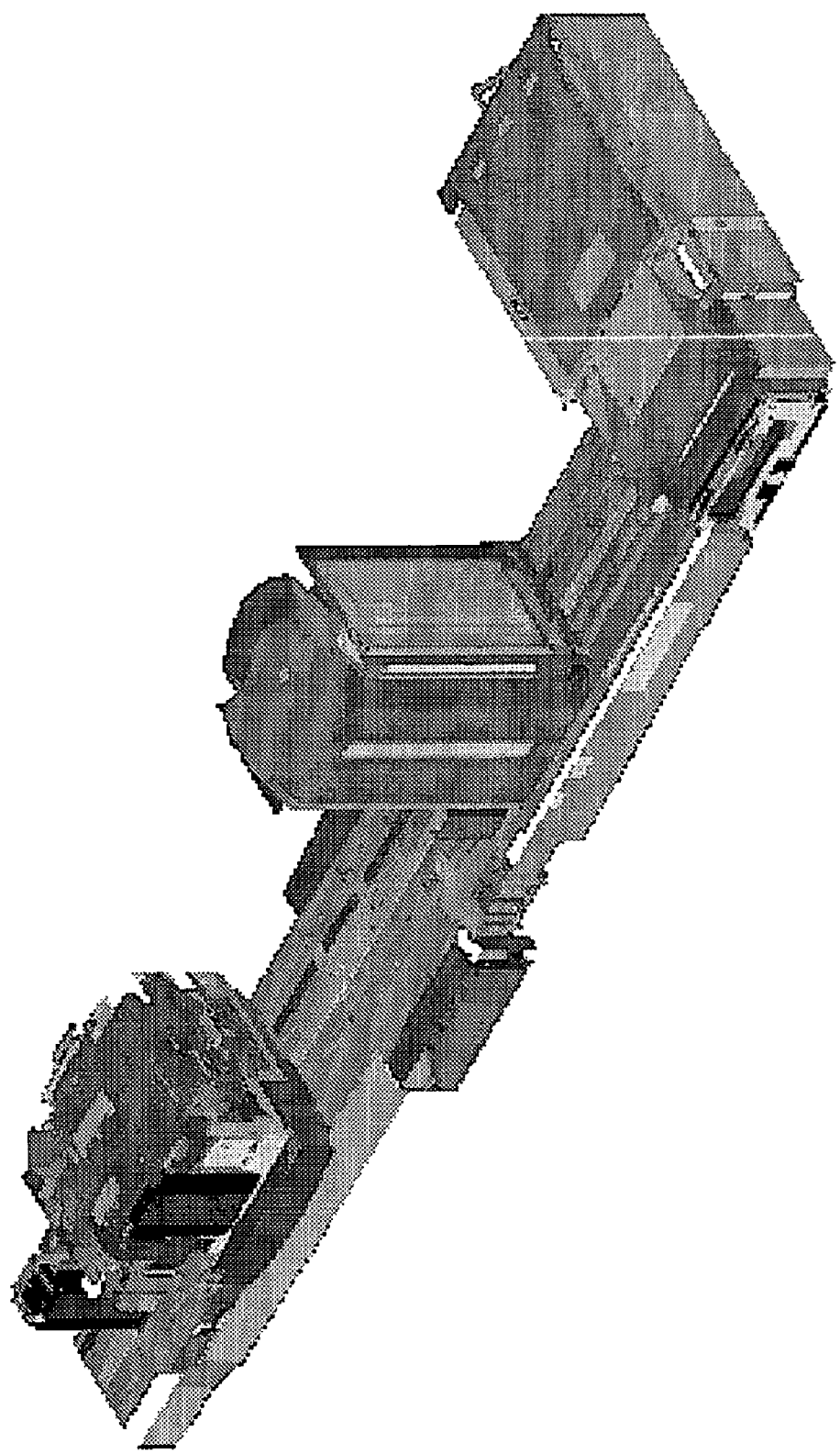
FIG. 23 is a view depicting a drawing example of a rough texture model in FIG. 21.
Figure 24:
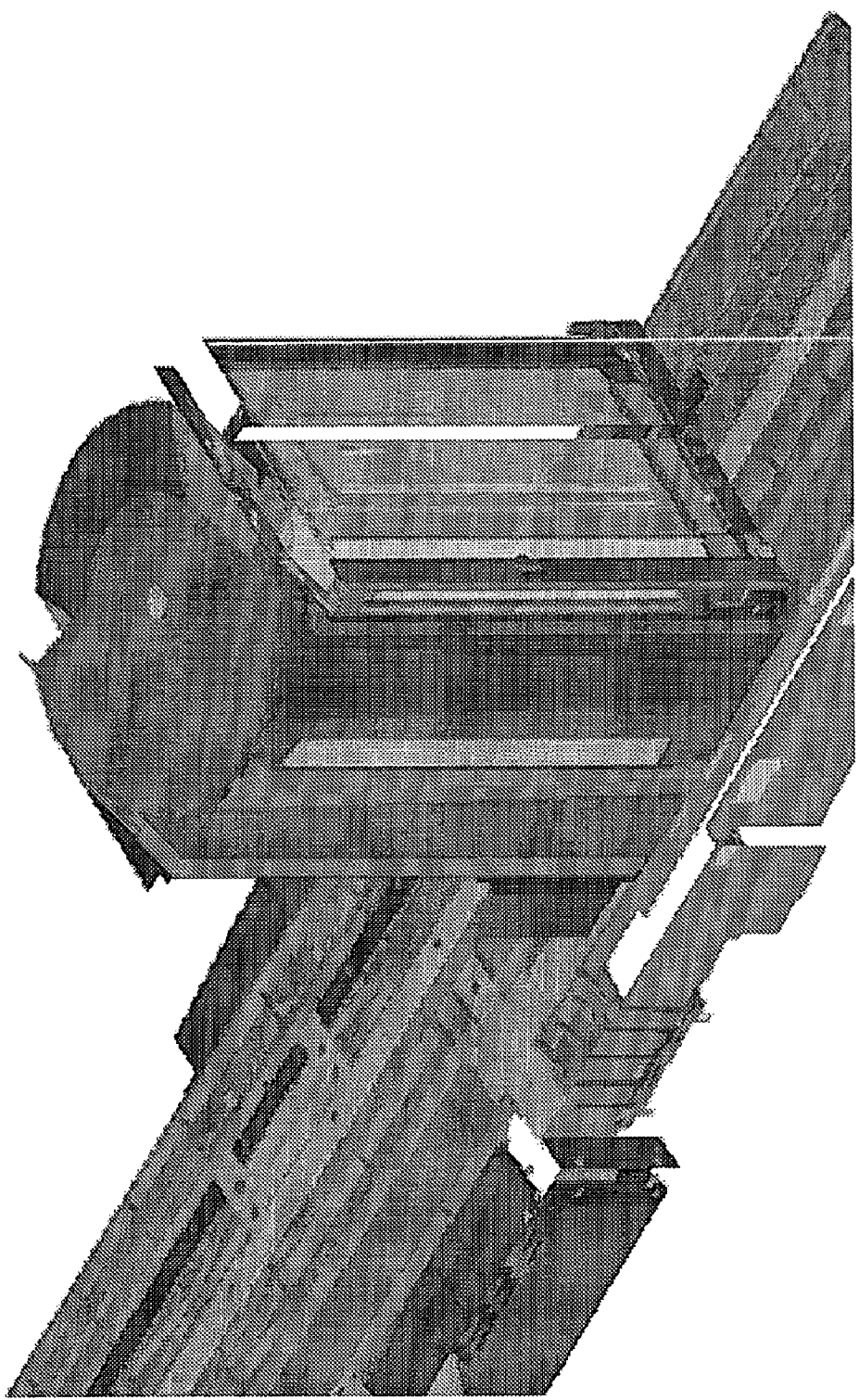
FIG. 24 is a view depicting a drawing example of a detailed texture model in FIG. 21.
Figure 25:
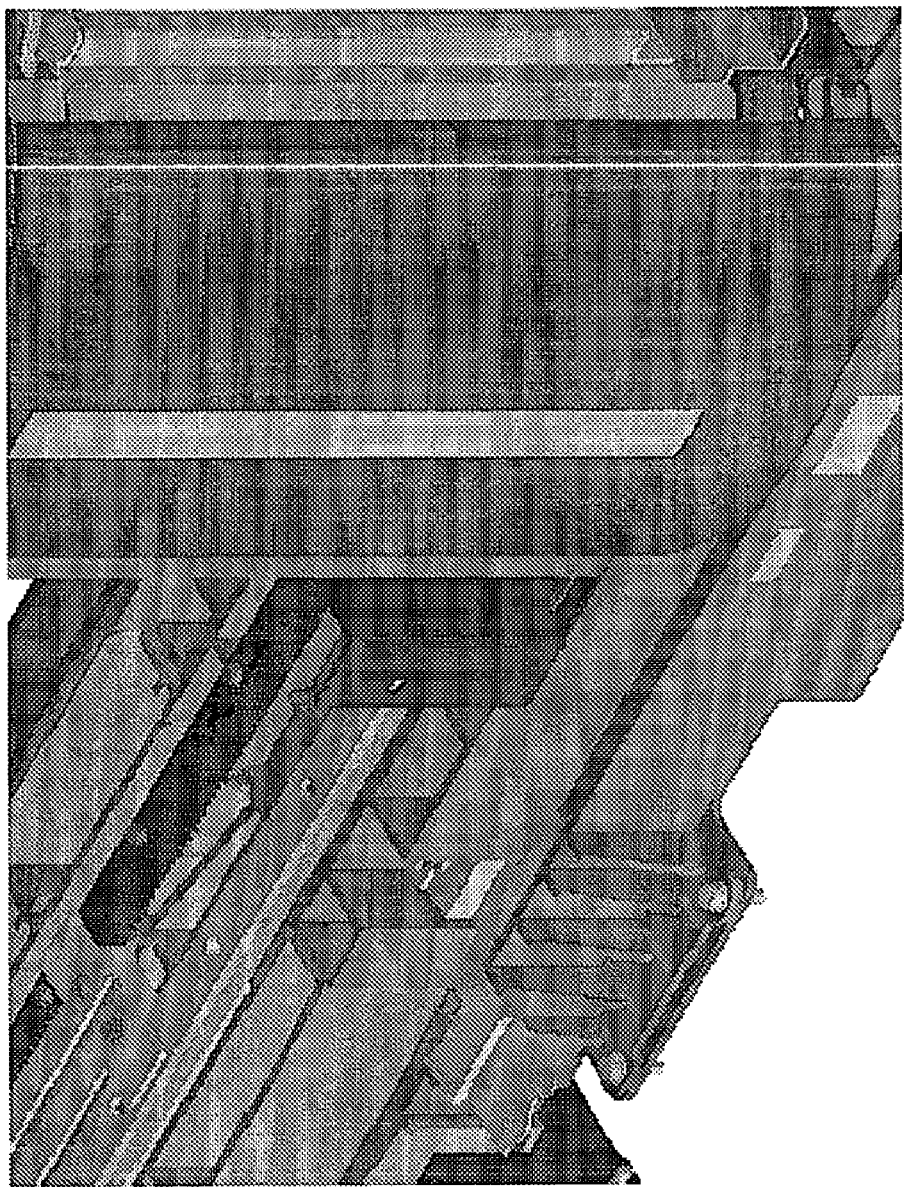
FIG. 25 is a view depicting an example returned to the original polygon model in FIG. 21.
Figure 26:
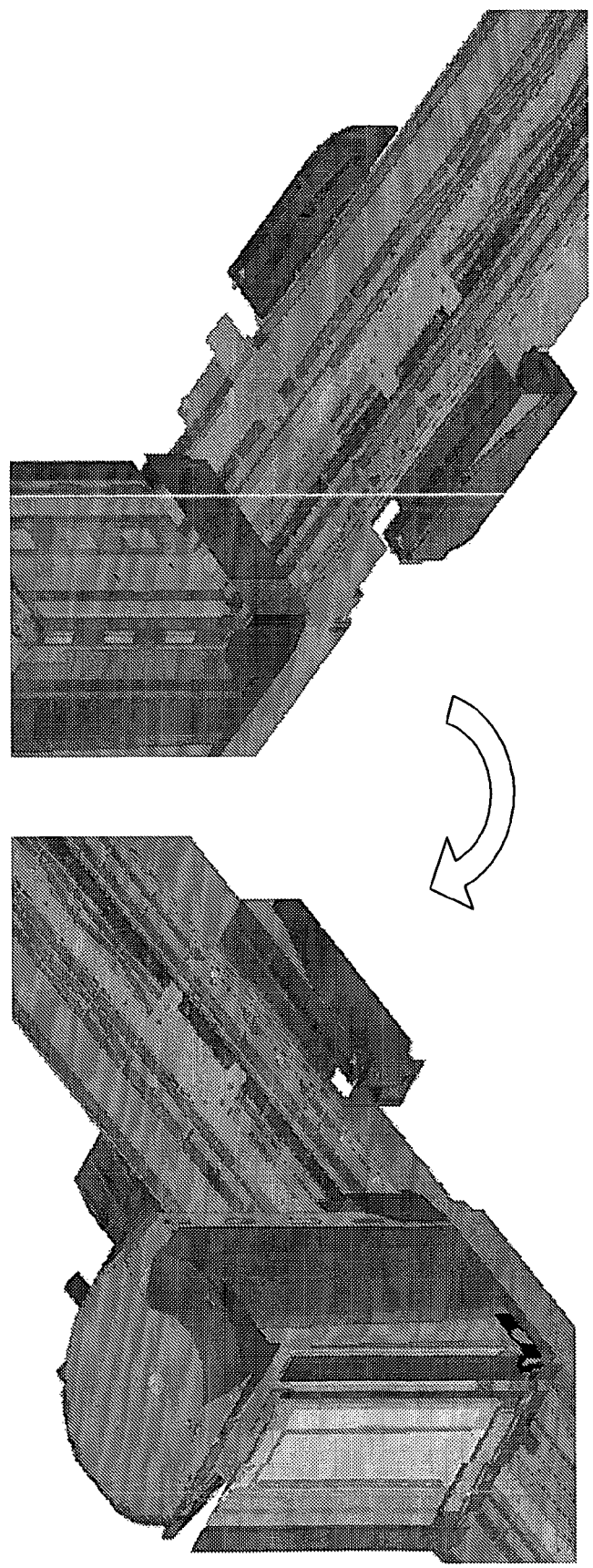
FIG. 26 is a view depicting texture image selection according to the line of sight in FIG. 21.

FIG. 21 is a flow chart depicting the texture model drawing processing according to an embodiment of the present invention; FIGS. 22 (A), (B) and (C) are diagrams depicting the view operation tool screen for FIG. 21; FIG. 23 is a view depicting a drawing example of a rough texture model in FIG. 21; FIG. 24 is a drawing example of a detailed texture model in FIG. 21; FIG. 25 is a view depicting an example returned to the original polygon model in FIG. 21; and FIG. 26 is a view depicting texture image selection according to the line of sight direction in FIG. 21.

The processing flow in FIG. 21 will now be described with reference to FIGS. 22 through 26. At first, as shown on the left side in FIG. 21, the view point position and direction are initialized at the start of drawing, and the model is drawn. By changing the view point position and view point direction by a mouse, a model according to this is drawn.

For this mouse operation, the view operation tool, shown in FIG. 22, is provided, and this tool is comprised of the view point rotation in FIG. 22 (A), view point shift in FIG. 22 (B) and zoom in FIG. 22 (C).

In the view point rotation tool in FIG. 22 (A), other than the icons for plane view, front view, side view, three-dimensional view and view point inversion, right and left rotation and horizontal rotation and vertical rotation with a predetermined axis at the center can be adjusted by the mouse. In the same way, in the view point shift tool in FIG. 22 (B), other than the icon for centering (making the click position to be the center of the screen), right and left shift, horizontal shift and vertical shift can be adjusted.

In the zoom tool in FIG. 22 (C), the reduction and enlargement ratio, other than the entire display and area enlargement display icons, can be adjusted by a mouse.

In FIG. 21, drawing processing with the view point position and view point direction specified in initialization or by a mouse will be described.

(S30) Based on the specified view point position, the enlargement ratio of the model is calculated.

(S32) It is judged whether the enlargement ratio is more than the threshold. When the enlargement ratio is more than the threshold, the processing returns to processing the polygon model in step S38.

(S34) When the enlargement ratio is not more than the threshold, a texture model, according to the view point position and the enlargement ratio, is selected, and a texture image according to the line of sight direction is selected. A case when this texture image must be selected occurs when a texture image with roughness according to the enlargement ratio is selected. In the case of a hole, for example, the shadow changes depending on the direction of viewing, and the user may want to see the inside by not displaying a component, or by moving a component. In such a case, the texture image is switched. For this, texture images from a plurality of directions and a texture image viewed from the rear side of the component are acquired in advance.

(S36) Then the position and direction of view point, vertex positions of the polygons, texture image, and mapping position, (see FIG. 11) are instructed to the graphics board 5 (see FIG. 1), and are drawn on the screen. Then return is executed.

(S38) When the enlargement ratio is more than the threshold in step S32, processing returns to the original polygon model. In other words, when a texture model is selected in the drawing processing, if the distance from the view point reaches a predetermined distance or less, it is better to return to the original polygon model to display an accurate model. For this, the view point position and direction, vertex position of the polygon and color of the polygon (see FIG. 10), which are input data, are instructed to the graphics board (see FIG. 1), and the model is drawn on the screen. Then return is executed.

The drawing processing does not slow down if Frustum-Culling activates when the view point approaches the model, as described above.

FIG. 23 is a drawing example of a rough texture model when the view point is far, and corresponds to the polygon model in FIG. 12. FIG. 24 is a drawing example of a detailed texture model enlarged when the view point is near. FIG. 25 is a drawing example when the view point is near, so the selection is returned to the original polygon model.

This is the same for the case of reduction. The texture model can be switched dynamically in this way by monitoring the enlargement ratio.

FIG. 26 is a drawing example when a texture image is selected according to the line of sight direction. This is an example when the user views the rear side, shifting the component, and in such a case, the texture images are switched.

In order to switch the texture module smoothly in the drawing processing, it is effective to adjust the timing of switching and the degree of roughness of the model. In other words, in terms of memory capacitance, it is not a good idea to provide a texture model for each enlargement ratio unit that the user can specify.

Therefore, instead of providing models with all degrees of roughness, it is necessary to narrow down to models having a predetermined roughness. For this, the quantitative approximation evaluation function between the original polygon model and texture model to be provided is effective, so that only texture models having a predetermined approximation rate are provided.

Figure 27:
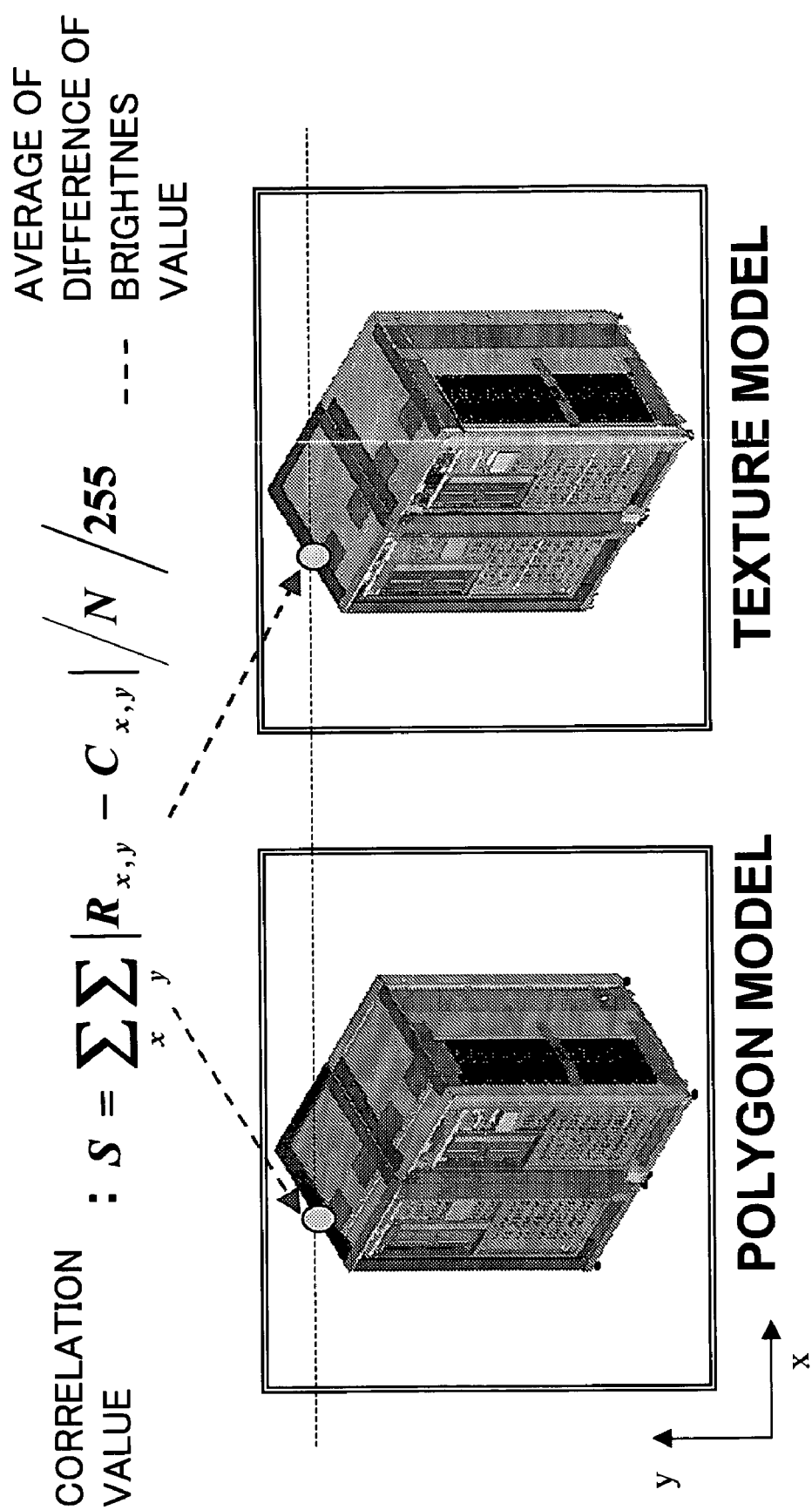
FIG. 27 is a view depicting the texture model evaluation method according to an embodiment of the present invention.
Figure 28:
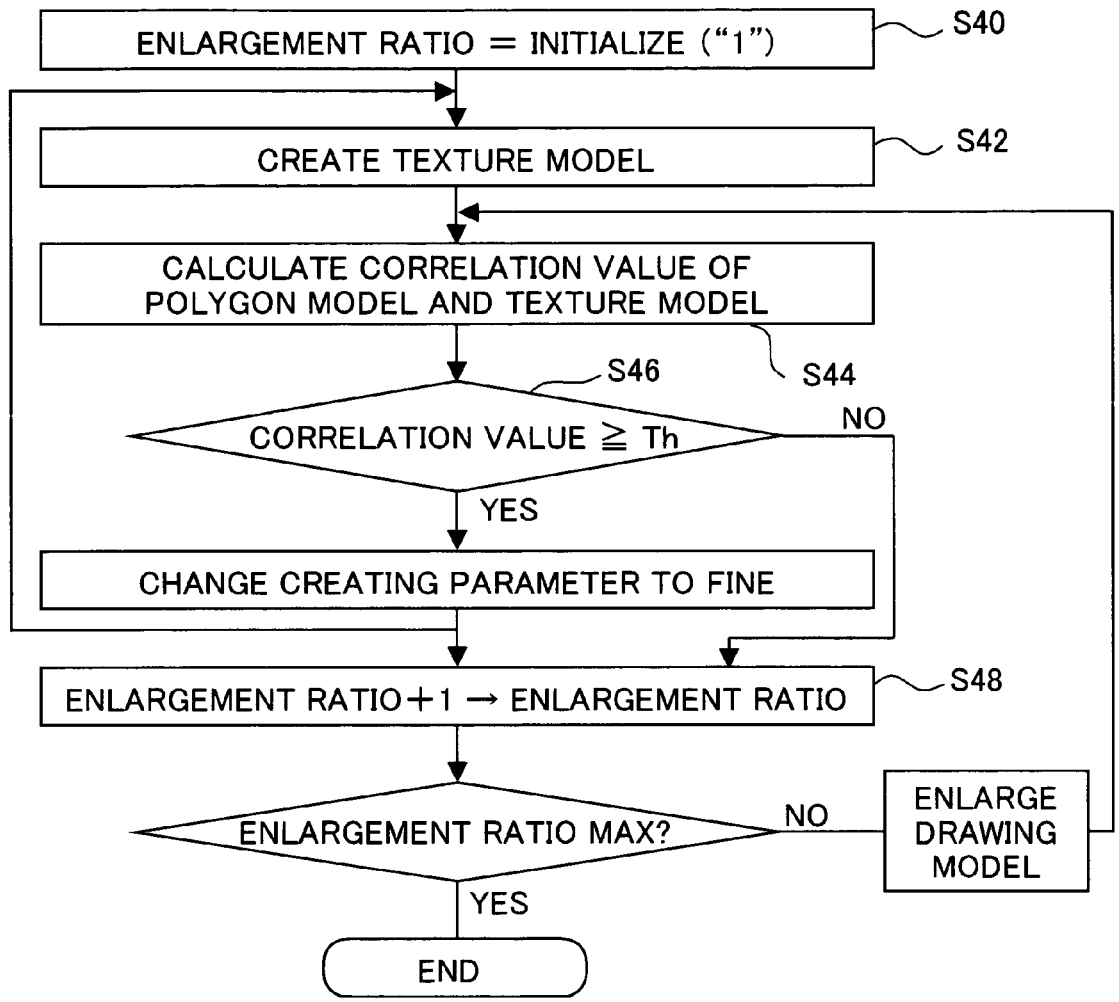
FIG. 28 is a flow chart depicting the texture model generation processing using the evaluation method in FIG. 27.
Figure 29:
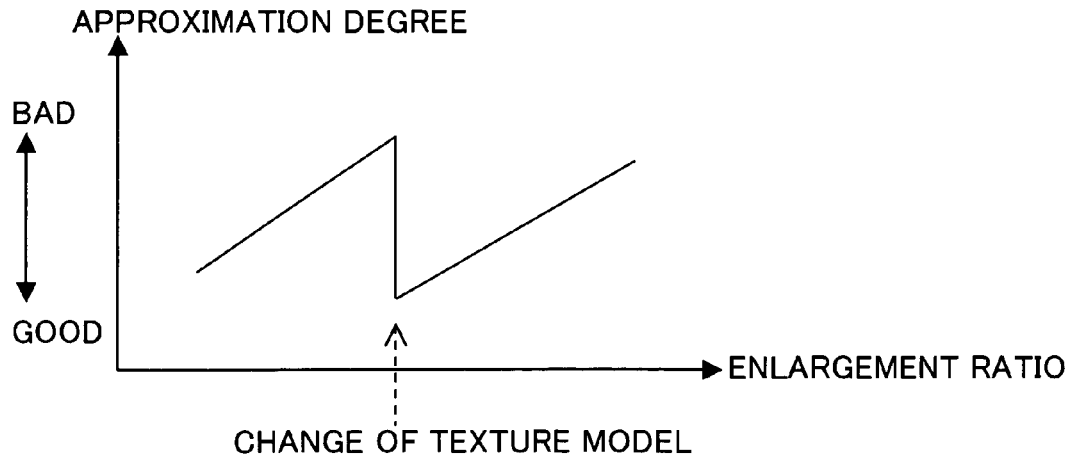
FIG. 29 is a graph depicting the texture model switching processing using the evaluation method in FIG. 27.

FIG. 27 is a view depicting the approximation degree quantitative evaluation, FIG. 28 is a flow chart depicting texture model selection and generation processing, and FIG. 29 is a graph depicting this processing.

The processing flow in FIG. 28 will be described with reference to FIG. 27 and FIG. 29.

(S40) At first, the enlargement ratio is initialized (e.g. "1"). By this, the above mentioned depth tolerance of the convex separation and detection precision of the silhouette method are determined according to the enlargement ratio of the initial value.

(S42) The above mentioned texture model creation processing described in FIG. 9 is executed, and the texture model is drawn.

(S44) Then the drawn image of the original polygon model and the drawn image of the texture model are compared. As FIG. 27 shows, the comparison can be quantitatively evaluated by determining the total of the entire image with respect to the absolute values of the difference of the brightness values of the same pixel positions. In other words, using the brightness value Rx, y of a pixel at a position (x, y) in the drawn image of the polygon model, the brightness value C x,y of a pixel at a position (x, y) in the drawn image of the texture model, and the total number of pixels N of the drawn image, the average of the differences of the brightness values is determined, and the correlation value (approximation degree) S is determined.

$$S=\Sigma\Sigma|Rx,y-Cx,y|/N/255$$

It is assumed that brightness takes a value 0-255, so the average of the difference of the brightness values is divided by "255".

(S46) The calculated correlation value S and the threshold Th are compared. When the correlation value S is greater than the threshold Th, it is judged that the approximation degree is not good with these creation parameters, and switching of texture models is necessary as shown in FIG. 29. In other words, the creation parameters (depth tolerance of convex separation and detection precision of the silhouette method) of the texture model is changed to "Fine", and processing returns to the texture model creation processing in step S42.

(S48) When the correlation value S is not greater than the threshold value Th, the approximation degree is good, so the enlargement ratio is incremented, and it is judged if the enlargement ratio is the maximum. If the enlargement ratio is not the maximum, the drawing model is enlarged, and processing returns to the calculation of the correlation value in step S44. If the enlargement ratio is the maximum, processing ends.

In this way, the drawing quality of texture expression is evaluated quantitatively, so the approximation degree can be acquired by measuring the correlation value from drawn images between the texture representation model and the accurate model. And by using this approximation degree, the texture model can be easily evaluated.

OTHER EMBODIMENTS

Figure 30:
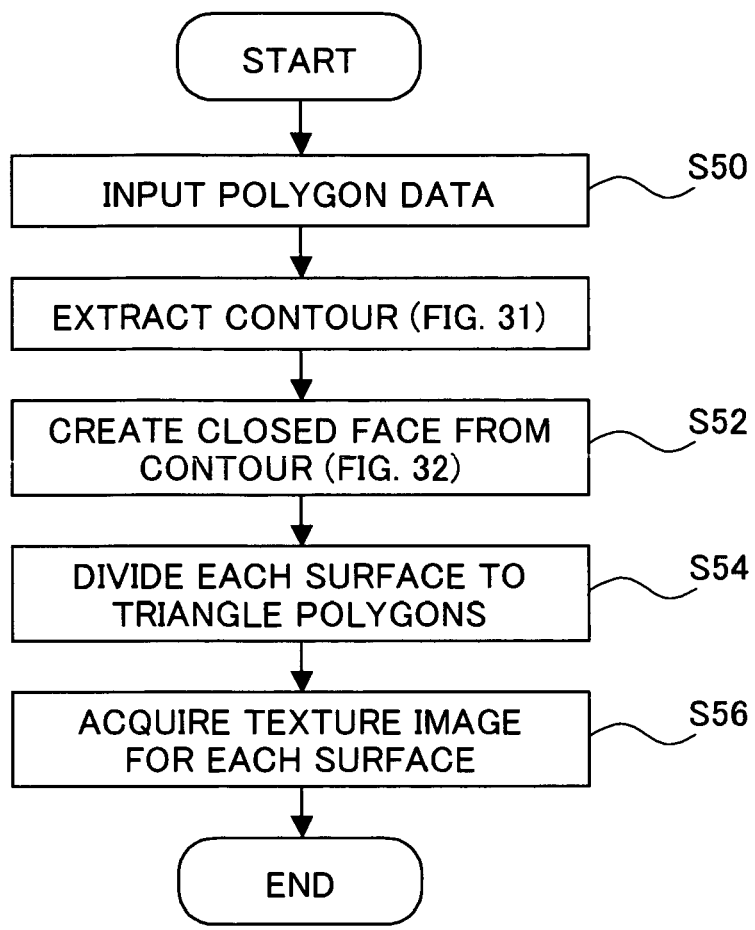
FIG. 30 is a flow chart depicting shape simplification processing according to another embodiment of the present invention.
Figure 31:
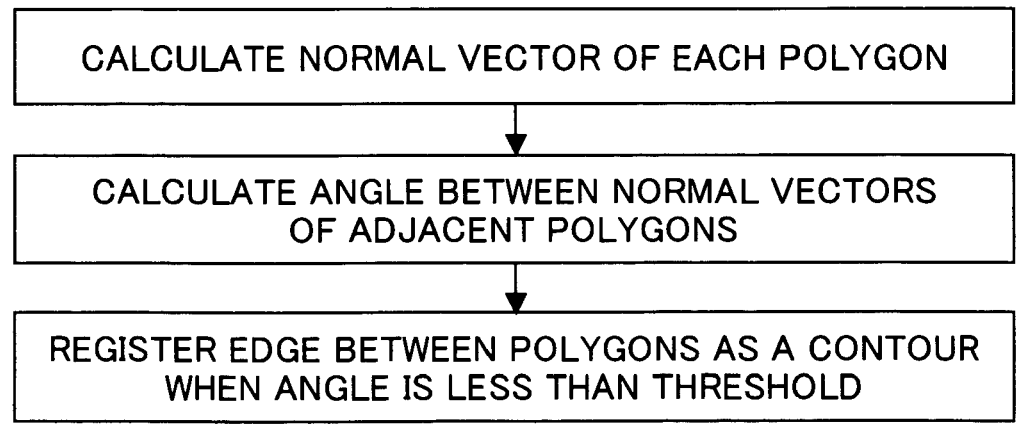
FIG. 31 is a flow chart depicting the contour extraction processing in FIG. 30.
Figure 32:
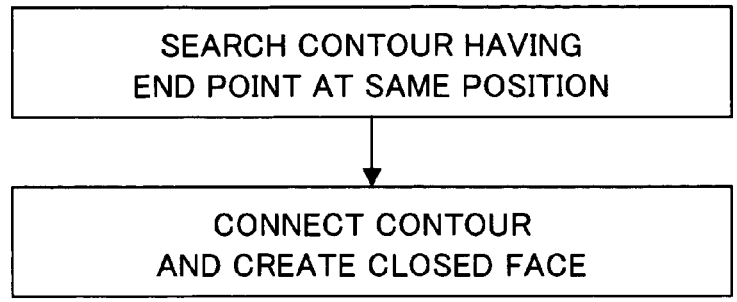
FIG. 32 is a flow chart depicting the processing to create a closed face from the contour in FIG. 30.
Figure 33:
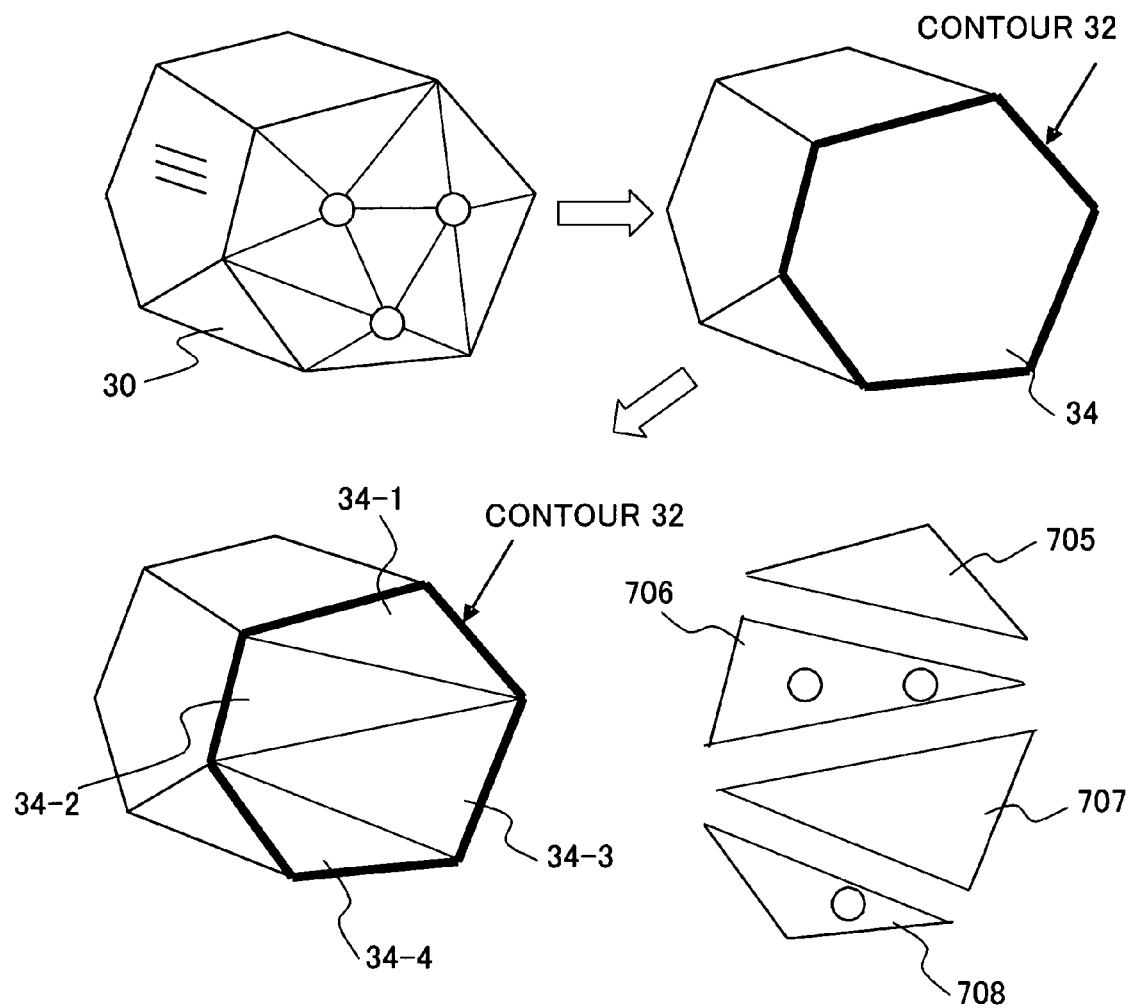
FIG. 33 is a diagram depicting the shape simplification processing in FIG. 30.
Figure 34:
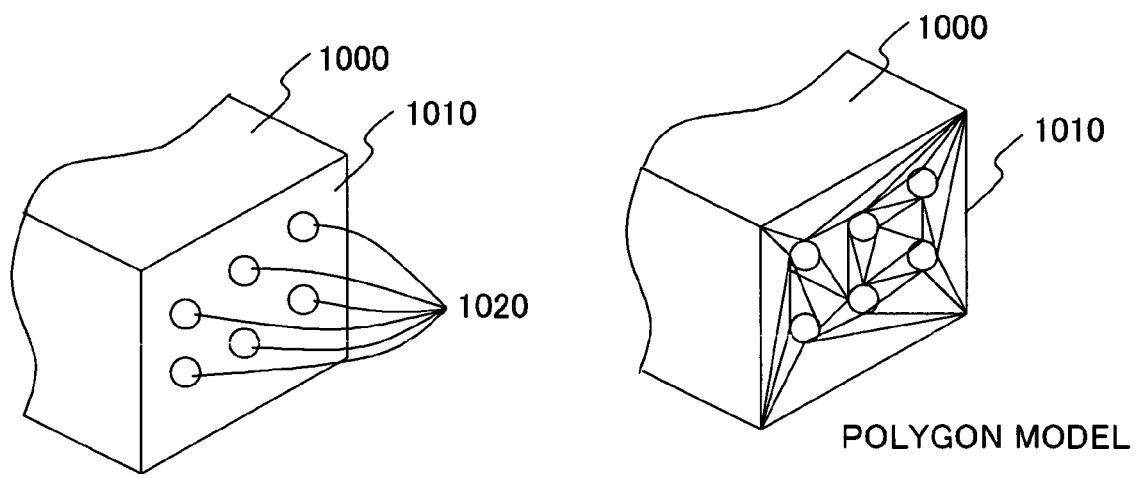
FIG. 34 is a diagram depicting a conventional polygon model.
Figure 35:
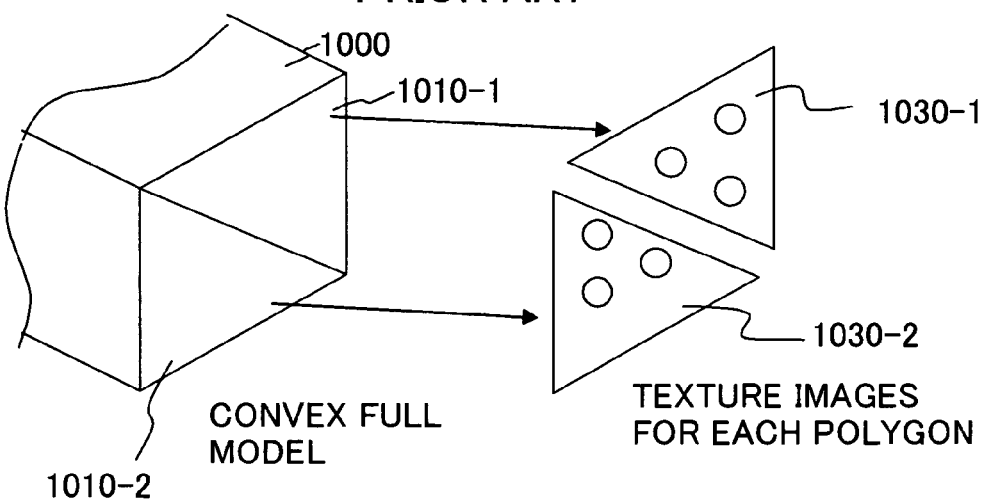
FIG. 35 is a diagram depicting a conventional texture model.

Other embodiments of the above mentioned three-dimensional model shape specification will be described. FIG. 30 is a flow chart depicting three-dimensional model shape simplification processing according to another embodiment of the present invention; FIG. 31 is a flow chart depicting the contour extraction processing in FIG. 30; FIG. 32 is a flow chart depicting the processing to create a closed face from the contour in FIG. 30; and FIG. 33 is a diagram depicting the three-dimensional model shape simplification processing according to still another embodiment of the present invention.

The above embodiment is suitable for the case when the polygon model is a cube, that is, a hexahedron. However, if the silhouette method is applied to the model 30, which has faces in various directions, such as a dodecahedron, as shown in FIG. 33, the number of projection directions must be increased, which makes creation processing complicated, and this creation processing takes time.

To prevent this, the appearance for each single component is simplified. In other words, the contours 32 of the component 30 are extracted, and the contours 32 are connected to create a closed face 34. This closed face 34 is separated into triangular polygons 34-1-34-4, and the texture images 705-708 are mapped on these polygons 34-1-34-4.

Now the shape simplification processing in FIG. 30 will be described with reference to FIG. 31 and FIG. 32.

(S50) The polygon data in FIG. 10 is input and the contours are extracted. As FIG. 30 shows, the normal vector of each polygon is calculated to extract the contour, and then the angle between the normal vectors of adjacent polygons is calculated. If the angle is less than the threshold, the edge between the polygons is registered as a contour.

(S52) The closed face 34 is created by connecting the contours 32. As FIG. 32 shows, for the end point of each contour, contours having this end point at the same position are searched, and contours having the end point at the same position are connected to create a closed face.

(S54) Each closed face 34 is separated into triangular polygons 34-1-34-4.

(S56) The texture image of this face is acquired, and each part of the texture image corresponds to each polygon 34-1-34-4, so as to create the mapping data.

In this way as well, the appearance of the three-dimensional model can be simplified, and flattening is possible for each face, so the number of polygons can be decreased. This is effective particularly when there are many faces in the model.

In the above embodiments, a model of mechanism components was described as an example, but the present invention can also be applied to a model with other configurations. Also as an appearance simplification method, plane generation by a convex enclosure (or convex hull) configuration, silhouette method and contour extraction were described, but as mentioned above, these methods can be used alone or in combination, according to the shape of the model.

The present invention was described by the embodiments, but the present invention can be modified in various ways within the scope of the essential character of the present invention, and these shall not be excluded from the scope of the present invention.

The appearance shape of the three-dimensional model is simplified, and small bumps are deleted from the three-dimensional polygon model, so as to create a model of which surface is flattened, so the number of polygons can be decreased and smooth drawing can be possible. Therefore the present invention is particularly effective to draw a complicated model smoothly in real-time.

What is claimed is:

1. A three dimensional drawing model generation method for generating a texture model for drawing a three-dimensional model as a texture image, comprising the steps of:
    flattening the surface of said three-dimensional model;
    acquiring the texture image of said flattened surface from the drawing image of said three-dimensional model; and
    generating said texture model by the polygons of said flattened surface and said texture image, wherein said step of flattening comprises:
    a step of detecting a hollow of said three-dimensional model;
    a step of separating said three-dimensional model at said hollow and keeping a portion directly beneath the detected hollow;
    a step of flattening each surface of each separated portion of said three-dimensional model comprising said separated hollow portion and a separate other portion except said hollow portion;
    a step of generating a model that encloses the entirety of said three-dimensional model;
    a step of calculating the distance from the model that encloses the entirety of said model to said three-dimensional model; and
    a step of displaying said three-dimensional model wherein all of said steps are executed on a computer which comprises a CPU, a storage device, a user input and a display.

2. The three-dimensional drawing model generation method according to claim 1, wherein said step of detecting a hollow of said three-dimensional model comprises:
    a step of generating a model that encloses the entirety of said three-dimensional model;
    a step of calculating the distance from the model that encloses the entirety of said model to said three-dimensional model; and
    a step of detecting said hollow by said distance when the calculated distance is equal to or more than a predetermined value.

3. The three-dimensional drawing model generation method according to claim 1, wherein said step of flattening comprises:
    a step of creating a projected image of said three-dimensional model;
    a step of linearly approximating contours of said projected image; and
    a step of reconstructing the three-dimensional model by said linearly approximated contours.

4. The three-dimensional drawing model generation method according to claim 1, wherein said step of flattening comprises:
    a step of extracting contours of said three-dimensional model; and
    a step of generating a closed face by connecting said contours.

5. The three-dimensional drawing model generation method according to claim 1, wherein said step of flattening comprises:
    a step of creating a projected image of said separated three-dimensional models respectively;
    a step of linearly approximating contours of said projected image; and
    a step of reconstructing said separated three-dimensional model by said linearly approximated contours.

6. The three-dimensional drawing model generation method according to claim 2, wherein said step of detecting a hollow comprises a step of detecting said hollow by comparing a distance being set and said calculated distance.

7. The three-dimensional drawing model generation method according to claim 6, further comprising a step of generating texture models with different precisions by changing said distance being set.

8. The three-dimensional drawing model generation method according to claim 4, further comprising a step of generating texture models with different precisions by changing the linear approximation precision of the contours of said projected image.

9. The three-dimensional drawing model generation method according to claim 1, further comprising:
   a step of calculating the difference between the drawing image of said texture model and the drawing image of said three-dimensional model; and
   a step of changing generation parameters of said texture model.

10. A three-dimensional model drawing method for drawing a three-dimensional model by using a texture image, comprising the steps of:
   drawing polygons of a model obtained by flattening said three-dimensional model; and
   mapping the flattened texture image of said flattened model to said polygons of said flattened model obtained by flattening surfaces of said three dimensional model,
   further comprising a step of selecting the flattened model and texture image with different precisions according to the distance between a view point and said three-dimensional model by switching a plurality of flattened models and texture images with different precisions,
   according to the distance between said view point and said three-dimensional models, said plurality of flattened models and texture images being obtained by flattening the surface of said three-dimensional model, acquiring the texture image of said flattened surface from the drawing image of said three-dimensional model, and
   generating said texture model by the polygons of said flattened surface and said texture image,
   wherein said step of flattening comprises:
   a step of detecting a hollow of said three-dimensional model;
   a step of separating said three-dimensional model at said hollow and keeping a portion directly beneath the detected hollow;
   a step of flattening each surface of each separated portion of said three-dimensional model comprising said separated hollow portion and a separate other portion except said hollow portion; and
   a step of displaying said three-dimensional model wherein all of said steps are executed on a computer which comprises a CPU, a storage device, a user input and a display.

11. The three-dimensional model drawing method according to claim 10, further comprising a step of detecting that the distance between said view point and said three-dimensional model becomes smaller than a predetermined value, and drawing a texture image from said three-dimensional model.

12. The three-dimensional model drawing method according to claim 10, further comprising a step of switching the texture images according to the direction of the line of sight.

13. The three-dimensional model drawing method according to claim 10, further comprising:
   a step of flattening the surface of said three-dimensional model;
   a step of acquiring the texture image of said flattened surface from the drawing image of said three-dimensional model; and
   a step of generating said texture model by the polygons of said flattened surface and said texture image.

14. A computer readable program, stored in the memory of a computer, for generating a texture model for drawing a three-dimensional model as a texture image, for having a computer execute the steps of:
   flattening the surface of said three-dimensional model;
   acquiring the texture image of said flattened surface from the drawing image of said three-dimensional model; and
   generating said texture model by polygons of said flattened surface and said texture image,
   wherein said step of flattening comprises:
   a step of detecting a hollow of said three-dimensional model; and
   a step of separating said three-dimensional model at said hollow and keeping a portion directly beneath the detected hollow, comprising said separated hollow portion and said separated other portion except said hollow portion; and
   a step of displaying said three-dimensional model wherein all of said steps are executed on a computer which comprises a CPU, a storage device, a user input and a display.

15. The computer readable program according to claim 14, for having a computer further execute:
   a step of calculating the difference between the drawing image of said texture model and the drawing image of said three-dimensional model; and
   a step of changing generation parameters of said texture model.

16. A three-dimensional model drawing program, stored in the memory of a computer, for drawing a three-dimensional model as a texture image, for having a computer execute the steps of:
   drawing polygons of a model obtained by flattening said three-dimensional model; and
   mapping the texture image of said flattened model to said flattened model,
   further comprising a step of selecting the flattened model and texture image with different precisions according to the distance between a view point and said three-dimensional model by switching a plurality of flattened models and texture images with different precisions,
   according to the distance between said view point and said three-dimensional model, said plurality of flattened models and texture images being obtained by flattening the surface of said three-dimensional model,
   acquiring the texture image of said flattened surface from the drawing image of said three-dimensional model, and generating said texture model by the polygons of said flattened surface and said texture image,
   wherein said step of flattening comprises:
   a step of detecting a hollow of said three-dimensional model;
   a step of separating said three-dimensional model at said hollow and keeping a portion directly beneath the detected hollow; and
   a step of flattening each surface of each separated portion of said three-dimensional model comprising said separated hollow portion and a separate other portion except said hollow portion; and
   a step of displaying said three-dimensional model wherein all of said steps are executed on a computer which comprises a CPU, a storage device, a user input and a display.

17. The three-dimensional drawing model generation method according to claim 1, wherein said step of acquiring the texture image comprises a step of acquiring each of the texture images of said separated portions from the drawing image of said three-dimensional model before said flattening surfaces of the three-dimensional model.

* * * * *